US006695119B2

(12) United States Patent
Yamamoto

(10) Patent No.: US 6,695,119 B2
(45) Date of Patent: Feb. 24, 2004

(54) BILL COUNTING MACHINE

(75) Inventor: Kaoru Yamamoto, Osaka (JP)

(73) Assignee: Laurel Machinery Co., Ltd, Osaka (JP)

( * ) Notice: Subject to any disclaimer, the term of this patent is extended or adjusted under 35 U.S.C. 154(b) by 376 days.

(21) Appl. No.: 09/859,960

(22) Filed: May 17, 2001

(65) Prior Publication Data

US 2002/0025065 A1 Feb. 28, 2002

(30) Foreign Application Priority Data

May 24, 2000 (JP) ....................................... 2000-152911

(51) Int. Cl.[7] .................................................. G06K 9/00
(52) U.S. Cl. ....................................... 194/206; 194/207
(58) Field of Search ................................ 194/206, 207; 377/8; 271/258.01; 209/534

(56) References Cited

FOREIGN PATENT DOCUMENTS

| | | |
|---|---|---|
| JP | 62-22922 | 11/1987 |
| JP | 6-342487 | 12/1994 |
| JP | 8-221543 | 8/1996 |
| JP | 61-41439 | 9/1996 |

*Primary Examiner*—Kathy Matecki
*Assistant Examiner*—Sang K Kim
(74) *Attorney, Agent, or Firm*—Cohen, Pontani, Lieberman & Pavane

(57) ABSTRACT

A bill counting machine includes a bill setting section, a bill take-out means for taking out bills from the bill setting section one by one into a main body of the bill counting machine, a bill conveyor for conveying the bills in a bill conveying passage, a sensor device for detecting optical properties and/or magnetic properties of each bill and producing detection data of the bill, a reference data memory for storing reference data of bills, a discriminator for comparing the detection data of the bill produced by the sensor device with the reference data of bills, thereby discriminating whether or not the bill is acceptable, the denomination of the bill and whether bills are being conveyed by the bill conveying means one by one and counting bills to be counted, and a bill stacking section, the bill counting machine further including a stopper locatable at a projecting position in the bill conveying passage downstream of the sensor device, the discriminator being constituted so as not to count a bill discriminated as unacceptable and a following bill or not to count two or more bills discriminated to be simultaneously conveyed and a following bill when it discriminates that the bill is unacceptable or that two or more bills are being simultaneously conveyed and to locate the stopper in the projecting position, the stopper located at the projecting position being accessible from outside of the main body of the bill counting machine. According to the thus constituted bill counting machine has small size and can prevent bills from jamming when the counting operation is restarted, and can sort unacceptable bills from acceptable bills and reliably collect them.

27 Claims, 10 Drawing Sheets

BILL COUNTING MACHINE

BACKGROUND OF THE INVENTION

The present invention relates to a bill counting machine and, particularly, such a machine having a small size which can prevent bills from being jammed when the counting operation is restarted, and can sort unacceptable bills from acceptable bills and reliably collect them.

DESCRIPTION OF THE PRIOR ART

In a bill counting machine, it is required to separate an unacceptable bill from acceptable bills and collect it when it is detected and, therefore, various methods have been proposed for separating an unacceptable bill from acceptable bills and collecting it when it is detected.

For example, Japanese Patent Publication No. 61-41439 discloses a bill counting machine constituted so as to take out bills placed on a hopper one by one, discriminate the denomination of the bills and stack them in a bill stacking section, wherein the counting operation is stopped when an unacceptable bill is detected.

Further, Japanese Utility Model Publication No. 62-22922 discloses a bill counting machine constituted so as to separate an unacceptable bill from acceptable bills and collect it by feeding the unacceptable bill to an unacceptable bill collecting section separately from a bill stacking section where acceptable bills are stacked as each acceptable bill is detected.

Furthermore, Japanese Patent Application Laid-Open Nos. 6-342487 and 8-221543 disclose bill counting machines constituted so as to separate an unacceptable bill from acceptable bills and collect it when the unacceptable bill is detected by stopping a vane wheel just at the time the unacceptable bill is held between adjacent vanes of the vane wheel for stacking bills in a bill stacking section.

However, as pointed out in Japanese Patent Publication No. 61-41439, if only the operation of the bill counting machine is stopped when an unacceptable bill is detected, it is impossible to predict where the unacceptable bill will be positioned in the bill transportation passage, and in the case where the handling speed of bills is high or the length of the bill transportation passage is short in a small bill counting machine, since the bill following the unacceptable bill is fed into the bill transportation passage at a time when the bill counting machine is stopped, it is difficult to identify the unacceptable bill, whereby the unacceptable bill cannot be separated from acceptable bills and be reliably collected.

Further, as disclosed in Japanese Utility Model Publication No. 62-22922, in the case where an unacceptable bill collecting section is provided separately from a bill stacking section where acceptable bills are stacked, the bill counting machine inevitably becomes large.

Furthermore, as disclosed in Japanese Patent Application Laid-Open Nos. 6-342487 and 8-221543, in the case where an unacceptable bill is separated from acceptable bills and collected when the unacceptable bill is detected by stopping a vane wheel at a time the unacceptable bill is just held between adjacent vanes of the vane wheel for stacking bills in a bill stacking section, it is practically difficult to stop the vane wheel just at the time the unacceptable bill is held between adjacent vanes of the vane wheel for stacking bills in a bill stacking section, and when the handling speed of bills is high or the length of the bill transportation passage is short in a small bill counting machine, it is difficult to predict where the bill following the unacceptable bill and fed into the bill transportation passage at the time the bill counting machine is stopped will be stopped in the bill transportation passage, whereby there is some risk of the bill following the unacceptable bill jamming when the operation of the bill counting machine is restarted.

SUMMARY OF THE INVENTION

It is therefore an object of the present invention to provide a bill counting machine of small size which can prevent bills from jamming when the counting operation is restarted, and can sort unacceptable bills from acceptable bills and reliably collect them.

The above and other objects of the present invention can be accomplished by a bill counting machine comprising a bill setting section where bills to be counted are set, a bill take-out means for taking out bills set in the bill setting section one by one into a main body of the bill counting machine, bill conveying means for conveying the bills taken out into the main body of the bill counting machine in a bill conveying passage, a sensor device for detecting optical properties and/or magnetic properties of each bill and producing detection data of the bill, reference data storing means for storing reference data of bills, discriminating and counting means for comparing the detection data of the bill produced by the sensor device with the reference data of bills, thereby discriminating whether or not the bill is acceptable, the denomination of the bill and whether bills are being conveyed by the bill conveying means one by one and counting bills to be counted, and a bill stacking section, the bill counting machine further comprising a stopper locatable at a projecting position in the bill conveying passage downstream of the sensor device, the discriminating and counting means being constituted so as not to count a bill discriminated as unacceptable and a following bill or not to count two or more bills discriminated to be simultaneously conveyed and a following bill when it discriminates that the bill is unacceptable or that two or more bills are being simultaneously conveyed and to locate the stopper in the projecting position, the stopper located at the projecting position being accessible from outside of the main body of the bill counting machine.

According to the present invention, a stopper is provided so as to be locatable at a projecting position in a bill conveying passage downstream of a sensor device and when an unacceptable bill is detected or two or more bills are being simultaneously conveyed, the stopper is located at the projecting position in the bill conveying passage by a discriminating and counting means. Therefore, the bill discriminated as unacceptable and the following bill, or two or more bills discriminated to be simultaneously conveyed and the following bill are stopped by the stopper, thereby being prevented from advancing to the bill stacking section. Further, since the stopper located at the projecting position is accessible from the outside of the main body of the bill counting machine, the bill discriminated as unacceptable and the following bill, or two or more bills discriminated to be simultaneously conveyed and the following bill can be easily and reliably collected. As a consequence, it is unnecessary to provide a separate collecting section for collecting the bill discriminated as unacceptable and two or more bills discriminated to be simultaneously conveyed, thereby enabling the bill counting machine to be made compact, and it is possible to reliably prevent the bill following the unacceptable bill from jamming when the operation of the bill counting machine is restarted.

In a preferred aspect of the present invention, the stopper is constituted so as to be movable between a retracted position where it does not interfere with bills conveyed in the bill conveying passage by the bill conveying means and the projecting position where it projects into the bill conveying passage.

In a further preferred aspect of the present invention, the stopper is constituted so as to be swingable between the retracted position and the projecting position.

In a further preferred aspect of the present invention, the stopper is constituted so as to be driven by a solenoid and the discriminating and counting means is adapted for actuating the solenoid, thereby moving the stopper between the retracted position and the projecting position.

According to this preferred aspect of the present invention, since the stopper can be driven by the solenoid, when an unacceptable bill is detected or when it is discriminated that two or more bills are being simultaneously conveyed, the stopper can be quickly moved to the projecting position, thereby causing it to stop the bill discriminated as unacceptable and the following bill, or two or more bills discriminated to be simultaneously conveyed and the following bill.

In a further preferred aspect of the present invention, the stopper is formed to be frame-like by a linear member so as to form at least one opening.

According to this preferred aspect of the present invention, since the stopper is formed to be frame-like by a linear member so as to form at least one opening, the air resistance can be reduced when the stopper is moved. Therefore, when an unacceptable bill is detected or when it is discriminated that two or more bills are being simultaneously conveyed, the stopper can be quickly moved to the projecting position, thereby causing it to stop the bill discriminated to be unacceptable and the following bill, or two or more bills discriminated to be simultaneously conveyed and the following bill. Further, the stopper can be located with a high degree of freedom while it is prevented from interfering with other constituents of the bill counting machine.

In a further preferred aspect of the present invention, the bill counting machine further comprises at least one vane wheel for stacking counted bills in the bill stacking section and the at least one vane wheel is disposed in the at least one opening of the stopper.

In a further preferred aspect of the present invention, an outer wall portion of the main body of the bill counting machine is formed with at least one opening and the at least one vane wheel is disposed in the at least one opening formed in the outer wall portion while the stopper is disposed outside of the main body of the bill counting machine.

According to this preferred aspect of the present invention, since the stopper is disposed outside of the main body of the bill counting machine, the operator can easily and reliably collect the bill discriminated as unacceptable and the following bill, or two or more bills discriminated to be simultaneously conveyed and the following bill stopped by the stopper.

In a further preferred aspect of the present invention, the bill counting machine further comprises a sensor for detecting bills conveyed in the bill conveying passage and the discriminating and counting means is constituted so as to stop the bill take-out means at a time when the discriminating and counting means discriminates that a bill is unacceptable or at a time when the discriminating and counting means discriminates that two or more bills are being simultaneously conveyed by the bill conveying means, to locate the stopper at the projecting position in the bill conveying passage at a time when the sensor detects the bill discriminated as unacceptable by the discriminating and counting means or the two or more bills being simultaneously conveyed by the bill conveying means, and to stop the bill conveying means when a predetermined time period has passed after the stopper was located at the projecting position in the bill conveying passage.

According to this preferred aspect of the present invention, since the discriminating and counting means is constituted so as to stop the bill take-out means at a time when the discriminating and counting means discriminates that a bill is unacceptable or at a time when the discriminating and counting means discriminates that two or more bills are being simultaneously conveyed by the bill conveying means, it is possible to prevent any further bill subsequent to the bill following the bill discriminated as unacceptable or the bill following the two or more bills discriminated to be simultaneously conveyed from being taken out into the bill counting machine. Further, since the discriminating and counting means is constituted so as to stop the bill conveying means when a predetermined time period has passed after the stopper was located at the projecting position in the bill conveying passage, it is possible to reliably cause only a bill discriminated as unacceptable and the following bill, or only two or more bills discriminated to be simultaneously conveyed and the following bill to come into abutment against the stopper and to be stopped. Therefore, the operator can easily and reliably collect the bill discriminated as unacceptable and the following bill, or two or more bills discriminated to be simultaneously conveyed and the following bill.

In a further preferred aspect of the present invention, the bill counting machine further comprises memory means for storing a count determined by the discriminating and counting means, and the discriminating and counting means is adapted to store a count for each denomination of bills in a bill count memory area of the memory means when it discriminates that the bill is acceptable.

According to this preferred aspect of the present invention, since a count for each denomination of bills is stored in the bill count memory area of the memory means when it discriminates that the bill is acceptable, even if bills of various denominations are mixed, bills can be efficiently counted.

In a further preferred aspect of the present invention, the bill counting machine further comprises memory means for storing a count determined by the discriminating and counting means and when the discriminating and counting means discriminates that a bill is acceptable but the denomination thereof is different from a reference denomination, it locates the stopper at the projecting position in the bill conveying passage without counting the bill of the denomination different from the reference denomination and a following bill.

According to this preferred aspect of the present invention, since the discriminating and counting means is constituted so as to locate the stopper at the projecting position in the bill conveying passage when it detects the bill of the denomination different from the reference denomination, it is possible to reliably cause the bill of the denomination different from the reference denomination and the following bill to come into abutment against the stopper and to be stopped. Therefore, the operator can easily and reliably collect the bill of the denomination different from the reference denomination and the following bill.

In a further preferred aspect of the present invention, the discriminating and counting means is constituted so as to define a denomination of a bill first discriminated as acceptable as the reference denomination.

According to this preferred aspect of the present invention, by setting bills so that a bill of the denomination whose number is greatest is first discriminated, it is possible to automatically stack bills of the denomination whose number is greatest.

In a further preferred aspect of the present invention, the bill counting machine further comprises reference denomination setting means for specifying the reference denomination.

In a further preferred aspect of the present invention, the bill counting machine further comprises reporting means for reporting results of discrimination made by the discriminating and counting means, and the discriminating and counting means is constituted so that, when it discriminates that a bill is unacceptable or that two or more bills are being simultaneously conveyed by the bill conveying means, it causes the reporting means to report that the bill was discriminated as unacceptable or that it was discriminated that two or more bills were being simultaneously conveyed by the bill conveying means, the reporting means being constituted as a means selected from a group consisting of a display means for displaying results of bill discrimination and an alarm means for generating an alarm.

According to this preferred aspect of the present invention, the operator can easily and reliably perceive that an unacceptable bill has been detected or that two or more bills have been simultaneously conveyed by the bill conveying means and that the unacceptable bill and the following bill or the two or more bills simultaneously conveyed and the following bill have been stopped by the stopper. Therefore, the operator can easily and reliably collect the unacceptable bill and the following bill or the two or more bills simultaneously conveyed and the following bill stopped by the stopper.

In a further preferred aspect of the present invention, the bill counting machine further comprises reporting means for reporting results of discrimination made by the discriminating and counting means, and the discriminating and counting means is constituted so that, when it detects a bill of a denomination different from the reference denomination, it causes the reporting means to report that the bill of a denomination different from the reference denomination has been detected, the reporting means being constituted as a means selected from a group consisting of a display means for displaying results of bill counting and an alarm means for generating an alarm.

According to this preferred aspect of the present invention, the operator can easily and reliably perceive that a bill of a denomination different from the reference denomination has been detected and that the bill of a denomination different from the reference denomination and the following bill have been stopped by the stopper. Therefore, the operator can easily and reliably collect the bill of a denomination different from the reference denomination and the following bill stopped by the stopper.

In a further preferred aspect of the present invention, the bill setting section is constituted so as to hold a greater number of bills than that the number of bills stackable in the bill stacking section and the discriminating and counting means is constituted so as to define an operation for counting bills until a maximum number of bills stackable in the bill stacking section have been stacked therein as one counting cycle, increase a bill count and stores the thus increased bill count every time it detects a bill to be counted, thereby counting bills to be counted until one counting cycle is completed, stop the bill take-out means and the bill conveying means and store a bill count determined during the counting cycle in a tentative count memory area in the memory means as a tentative bill count every time one counting cycle of bills is completed, and then drive the bill take-out means and the bill conveying means, thereby starting a succeeding counting cycle of bills set in the bill setting section.

According to this preferred aspect of the present invention, the bill setting section is constituted so as to hold a greater number of bills than the number of bills stackable in the bill stacking section and the discriminating and counting means is constituted so as to define an operation for counting bills until the maximum number of bills stackable in the bill stacking section have been stacked as one counting cycle, increase the bill count and store the thus increased bill count every time it detects a bill to be counted, thereby counting bills to be counted until one counting cycle is completed, stop the bill take-out means and the bill conveying means and store the bill count determined during the counting cycle in a tentative count memory area in the memory means as a tentative bill count every time one counting cycle of bills is completed, and then drives the bill take-out means and the bill conveying means, thereby starting the succeeding counting cycle of bills set in the bill setting section. Therefore, even if bill jamming occurs and the counting of bills is stopped, since the counting of bills can be restarted by setting the tentative count determined in previous counting cycles as an initial value, it is unnecessary to recount the bills and even if the bill counting machine is made compact by omitting provision of an unacceptable bill collecting means and an unacceptable bill collecting section, it is still possible to prevent bill counting efficiency from being lowered and efficiently count bills.

In a further preferred aspect of the present invention, the discriminating and counting means is constituted so as to overwrite the tentative count determined and stored in the tentative count memory area of the memory means at the proximate counting cycle with a bill count determined in the counting cycle every time one counting cycle is completed, thereby updating the tentative count, and to store the thus updated tentative count in the tentative count memory area of the memory means.

According to this preferred aspect of the present invention, the discriminating and counting means is constituted so as to overwrite the tentative count determined and stored in the tentative count memory area of the memory means at the proximate counting cycle with a bill count determined in the counting cycle every time one counting cycle is completed, thereby updating the tentative count and to store the thus updated tentative count in the tentative count memory area of the memory means. Therefore, even if bill jamming occurs and the counting of bills is stopped, since the counting of bills can be restarted by setting the tentative count determined in previous counting cycles as an initial value, it is unnecessary to recount the bills and even if the bill counting machine is made compact by omitting provision of an unacceptable bill collecting means and an unacceptable bill collecting section, it is still possible to prevent bill counting efficiency from being lowered and efficiently count bills.

In a further preferred aspect of the present invention, the discriminating and counting means is constituted so that when it discriminates that bill jamming has occurred in the bill counting machine it stops the bill take-out means and the bill conveying means, clears the bill count stored in the bill count memory area of the memory means, stores the tentative count stored in the tentative count memory area as an initial value of the bill count in the bill count memory area, and drives the bill take-out means and the bill conveying means, thereby restarting the counting of bills set in the bill setting section.

According to this preferred aspect of the present invention, the discriminating and counting means is constituted so that when it discriminates that bill jamming has occurred in the bill counting machine it stops the bill take-out means and the bill conveying means, clears the bill count stored in the bill count memory area of the memory means, stores the tentative count stored in the tentative count memory area as an initial value of the bill count in the bill count memory area, and drives the bill take-out means and the bill conveying means, thereby restarting the counting of bills set in the bill setting section. Therefore, although it is impossible to judge how many bills are jammed and it is normally necessary to recount bills when bill jamming occurs, according to this preferred aspect of the present invention, bill counting can be restarted using the tentative bill count determined in all counting cycles already performed as an initial value and it is possible to markedly efficiently count bills.

In a further preferred aspect of the present invention, the discriminating and counting means is constituted so as to store the number of counted bills for each denomination in the bill count memory area of the memory means and store the number of bills for each denomination counted in the counting cycles already performed as a tentative bill count in the tentative count memory area of the memory means.

The above and other objects and features of the present invention will become apparent from the following description made with reference to the accompanying drawings.

DESCRIPTION OF THE PREFERRED EMBODIMENTS

Figure 1:
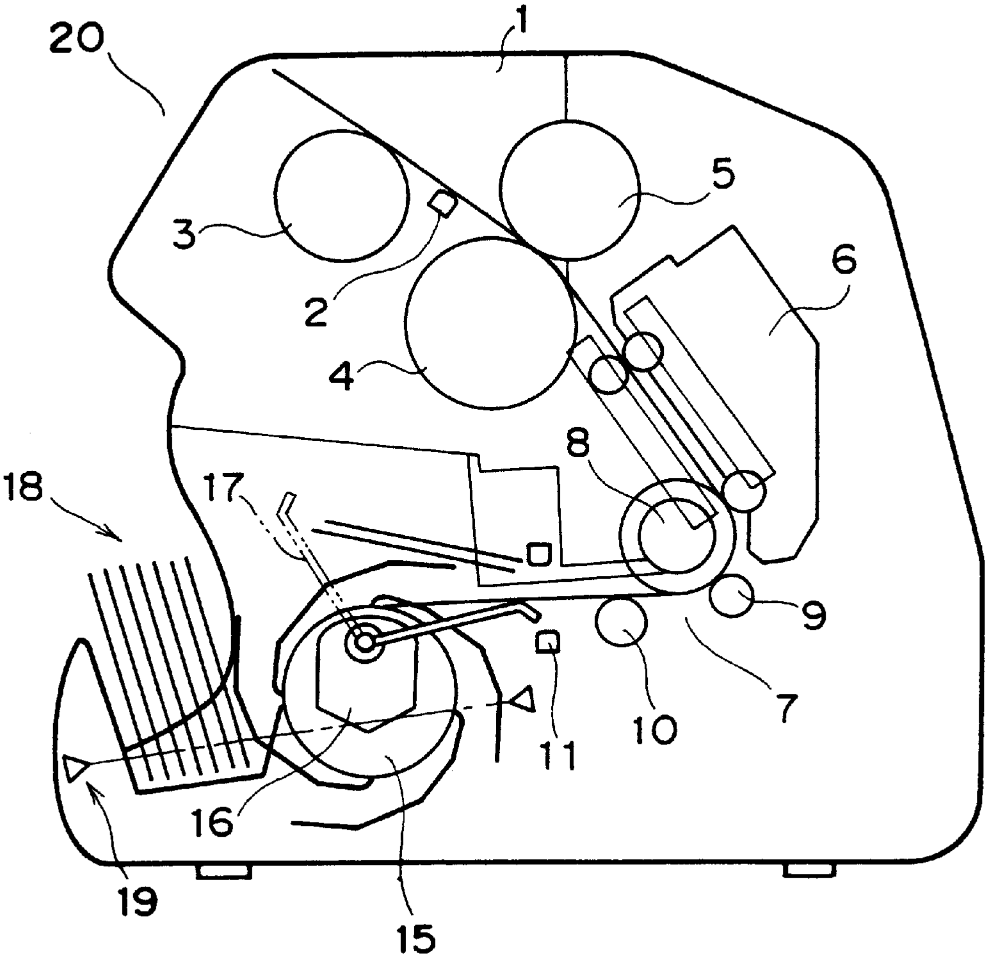
FIG. 1 is a schematic longitudinal cross-sectional view showing a bill counting machine which is a preferred embodiment of the present invention.

As shown in FIG. 1, a bill counting machine includes a bill hopper 1 to which bills to be counted are charged, a bill sensor 2 for detecting whether or not a bill is present in the bill hopper 1, a kick-out roller 3 for abutting against the lowermost bill charged in the bill hopper 1 and being rotated, thereby kicking out the lowermost bill into the inside of the bill counting machine, a take-out roller 4 for taking out bills kicked out by the rotation of the kick-out roller 3 into the inside of the bill counting machine and a separation roller 5 rotatable in the direction opposite to the take-out roller 4 for separating bills one by one in cooperation with the take-out roller 4.

A sensor device 6 for judging whether or not bills are acceptable and a feed roller 8 for feeding bills into a bill conveying passage 7 are further provided downstream of the take-out roller 4 and the separation roller 5.

In the bill conveying passage 7, conveyor rollers 9, 10 and a sensor 11 for detecting bills are provided.

At the downstream end portion of the bill conveying passage 7, a pair of vane wheels 15, 15 provided with a plurality of vanes for stacking bills in a bill stacking section 18 and a stopper 17 swingable by a solenoid 16 are provided.

Downstream of the pair of vane wheels 15, 15, the bill stacking section 18 is provided for stacking counted bills. The bill counting machine further includes a stacked bill sensor 19 and an operation panel 20.

The stopper 17 is constituted so as to be swingable between a retracted position below the bill conveying passage 7 and a projecting position projected into the bill conveying passage 7. When the stopper 17 is located at the retracted position, bills are conveyed in the bill conveying passage 7 and when the stopper 17 is located at the projecting position, bills are prevented by the stopper 17 from being fed into the bill stacking section 18. The stopper 17 is normally held at the retracted position and is moved to the projecting position only when a drive signal is output to the solenoid 16 from a CPU (central processing unit) described later.

Figure 2:
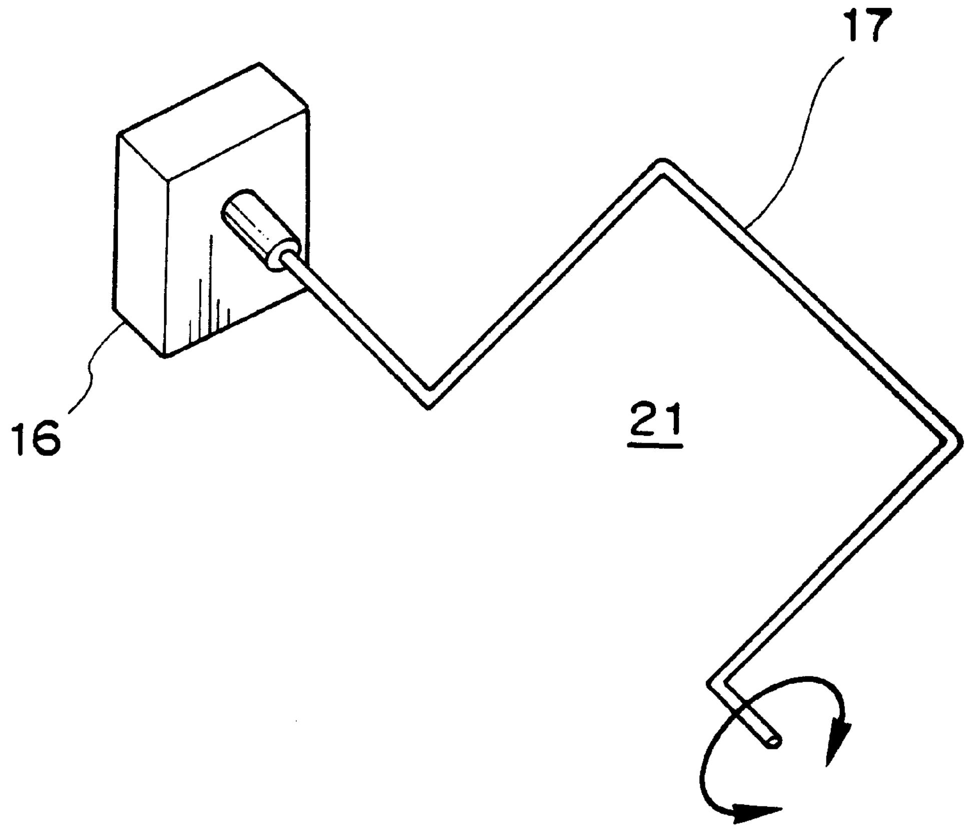
FIG. 2 is a schematic perspective view showing a stopper.

FIG. 2 is a schematic perspective view showing the stopper 17.

As shown in FIG. 2, the stopper 17 is formed to be frame-like of a flexible material such as a piano wire so that a substantially rectangular opening 21 can be formed. The stopper 17 is formed in such a manner that the width of the substantially rectangular opening 21 is smaller than the minimum width of bills to be counted.

Figure 3:
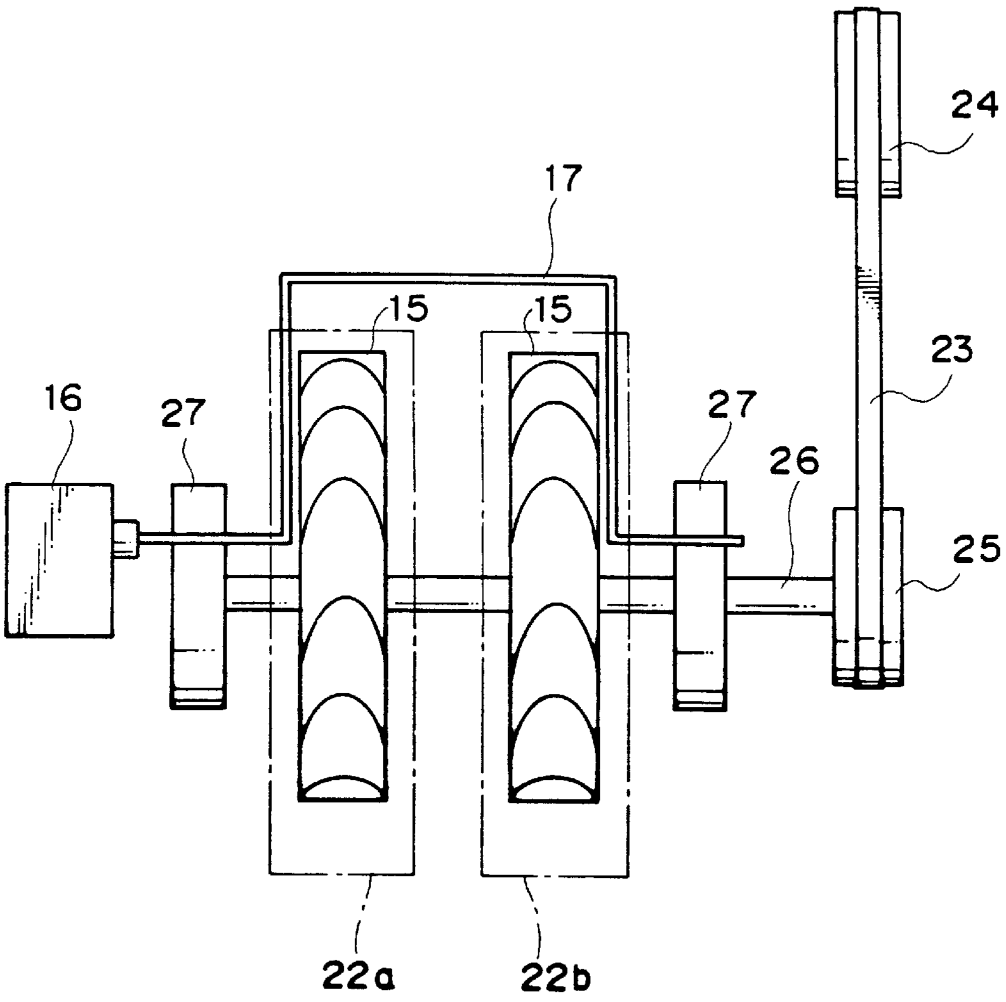
FIG. 3 is a schematic plan view showing the principal part of a stopper held at a retracted position, a pair of vane wheels, and a solenoid.
Figure 4:
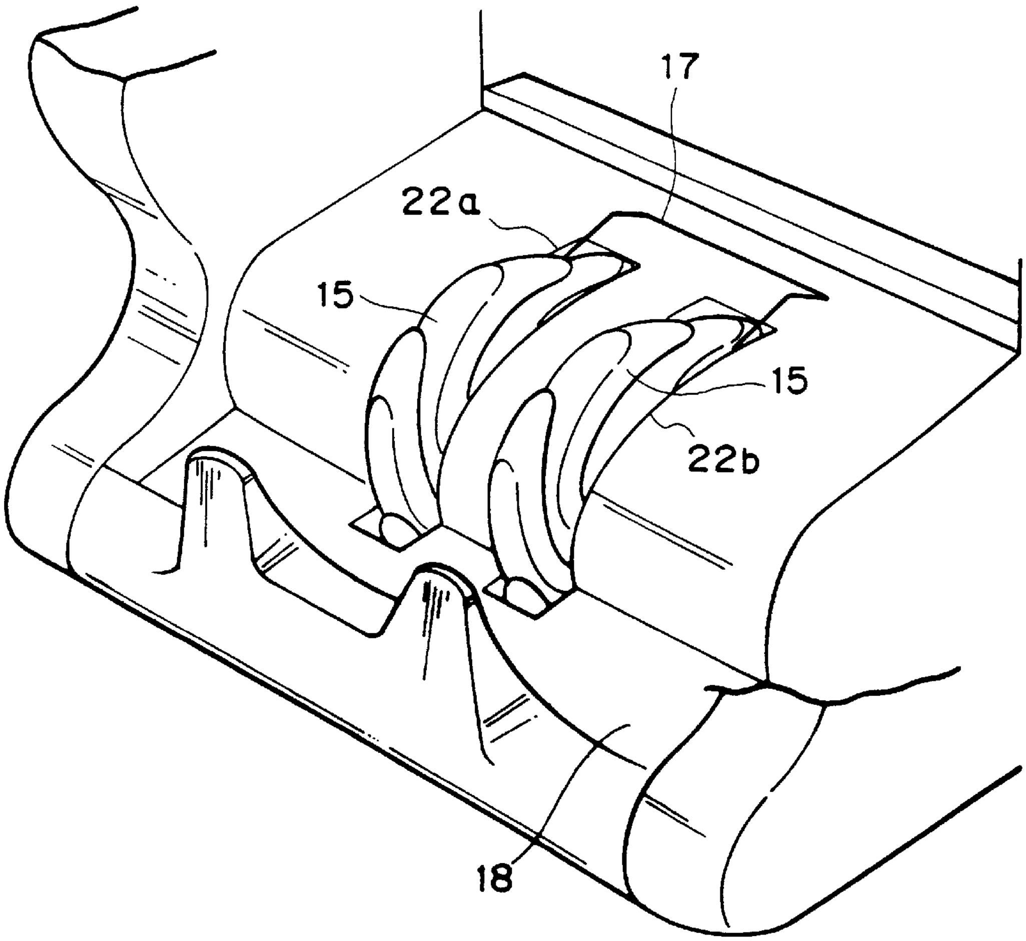
FIG. 4 is a schematic perspective view showing a bill counting machine.

FIG. 3 is a schematic plan view showing the principal part of the stopper 17 held at the retracted position, the pair of vane wheels 15, 15 and the solenoid 16, and FIG. 4 is a schematic perspective view showing the bill counting machine.

As shown in FIG. 3, the pair of vane wheels 15, 15 are disposed in the substantially rectangular opening 21 formed by the stopper 17. As shown in FIG. 4, the stopper 17 held at the retracted position and the pair of vane wheels 15, 15 are disposed so as to be exposed to the outside of the bill counting machine through openings 22*a* and 22*b* formed in an outer wall portion of the bill counting machine and the stopper 17 is constituted to be swingable outside of the bill counting machine. In FIG. 3, the reference numeral 23 designates an endless drive belt wound around a drive pulley 24 and a driven pulley 25, the reference numeral 26 designates a drive shaft of the pair of vane wheels 15, 15 and the reference numerals 27 and 27 designate frames. The drive pulley 24 is mounted on the output shaft (not shown) of a motor (not shown).

M number of bills can be charged in the bill hopper 1 and N number of bills can be stacked in the bill stacking section 18, where N is a positive integer smaller than M. In this embodiment, M and N are set as, for example, 500 and 200.

The sensor device 6 which comprises a light emitting means (not shown) for emitting light toward a bill and a light receiving means (not shown) for detecting light transmitted through the bill, detects an amount of transmitted light and produces transmitted light amount data, optically detects the sizes of bills, thereby producing size detection data of bills and outputs the data to a CPU described later. In this embodiment, the sensor device 6 is further constituted so as to detect light emitted from the light emitting means and reflected by a bill, thereby detecting a surface pattern of the bill and producing surface pattern detection data of bills, detect fluorescence released from fluorescent substances contained in bills when they are excited by an ultraviolet ray emitted from an ultraviolet ray source (not shown), thereby producing fluorescence detection data, detect by means of a magnetic detecting means (not shown) change in a magnetic field generated by a magnetic field generating means (not shown) caused by magnetic material contained in or metal pieces formed on bills placed in the magnetic field, thereby detecting the magnetic material contained in ink used for printing bills or the metal pieces formed on bills and producing magnetic detection data or metal piece detection data of bills, and output the data to a CPU described later.

Figure 5:
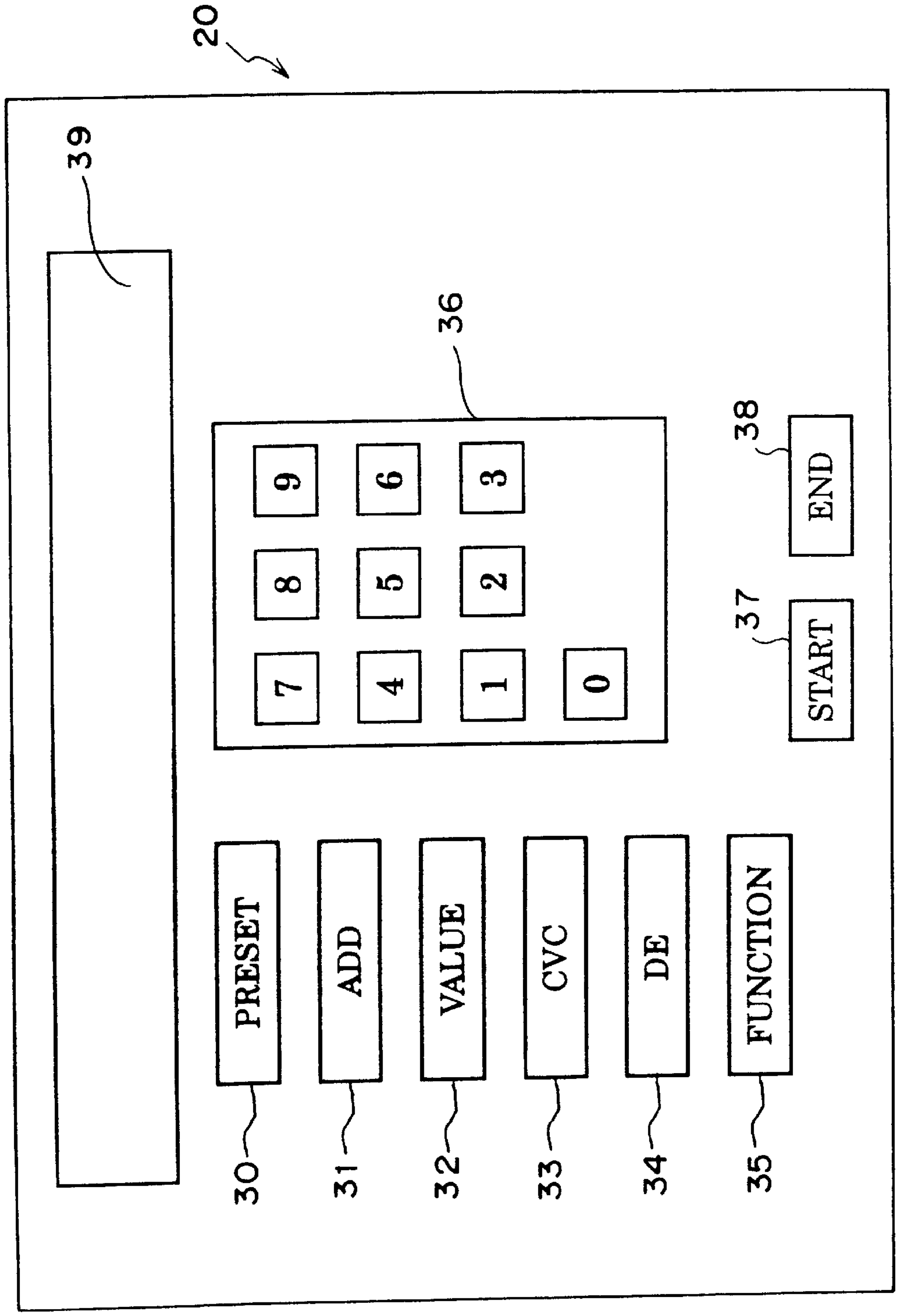
FIG. 5 is a schematic front view showing an operation panel.

As shown in FIG. 5, the operation panel 20 includes a "PRESET" key 30 pressed for specifying the number of bills to be counted, an "ADD" key 31 pressed when bills are counted in an addition mode in which the number of bills to be counted is added to the number of bills already counted, a "VALUE" key 32 pressed when bills are counted in a bill value display mode in which the value of counted bills is displayed, a "CVC" key 33 pressed when bills are counted in a successive counting mode in which after the count of N bills is completed, the N bills are taken out from the bill stacking section 18 and (M–N) bills remaining in the bill hopper 1 are successively counted, a "DE" key 34 pressed for selecting whether the value of bills for each denomination is to be displayed or the total value of bills is to be displayed in the bill value display mode selected by pressing the "VALUE" key 32, a "FUNCTION" key 35 pressed for setting various detection level such as a threshold value defining a tolerance within which the magnetic properties, the size and surface pattern of a bill detected by the sensor device 6 are considered to coincide with the reference magnetic data, the reference size data and the reference surface pattern data of a bill, a ten-key numeric pad 36, a "START" key 37 pressed for starting the counting of bills, an "END" key 38 pressed for completing the counting operation, and a display section 39.

Figure 6:
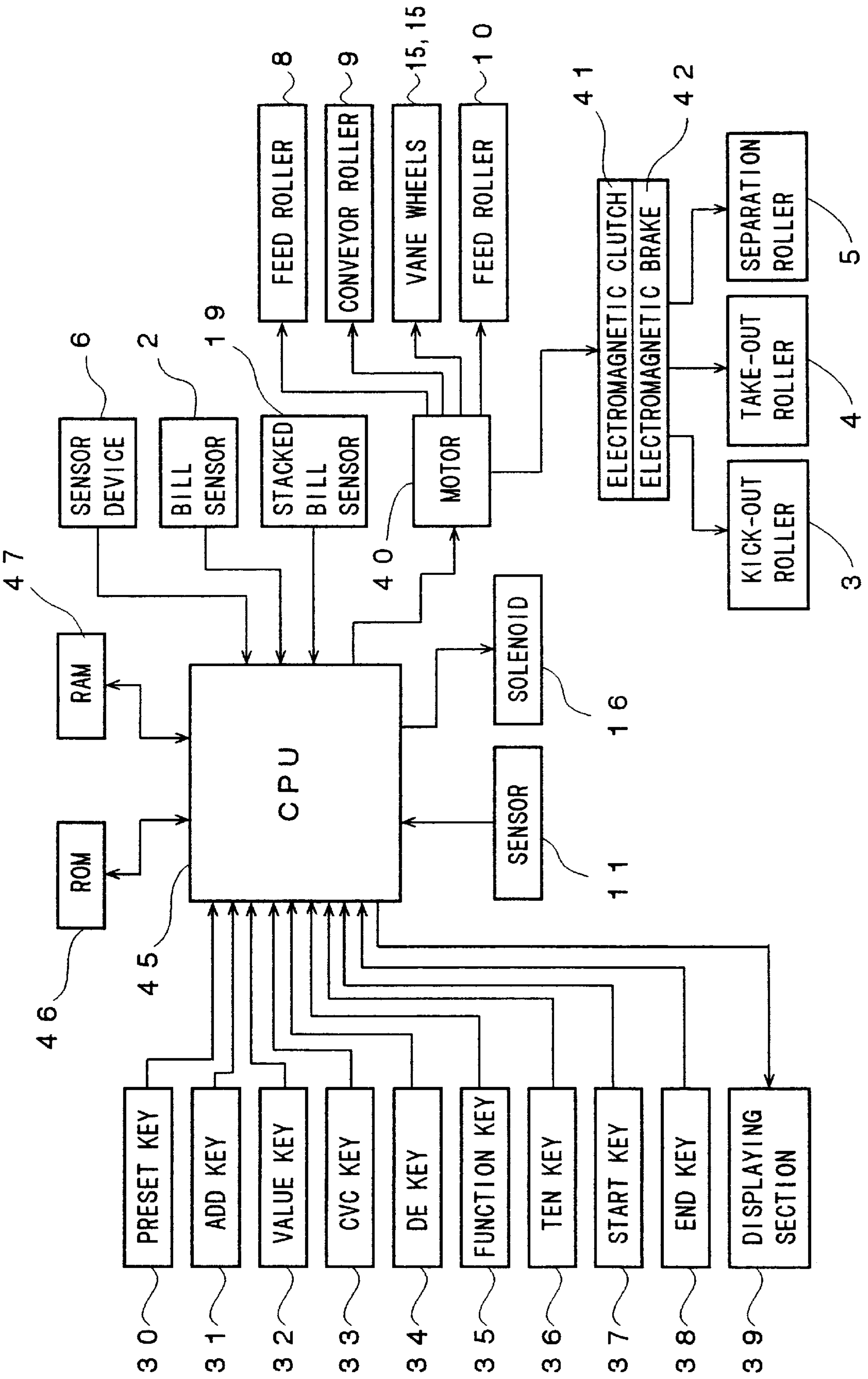
FIG. 6 is a block diagram of a drive system, a detection system, a control system, an input system and a display system of a bill counting machine, which is a preferred embodiment of the present invention.

FIG. 6 is a block diagram of a drive system, a detection system, a control system, an input system and a display system of the bill counting machine, which is a preferred embodiment of the present invention.

As shown in FIG. 6, the drive system of the bill counting machine includes the kick-out roller 3, the take-out roller 4, the separation roller 5, the feed roller 8, the conveyor roller 9, a motor 40 for driving the conveyor roller 10 and the drive pulley 24, and the solenoid 16 for driving the stopper 17. The driving force of the motor 40 is intermittently transmitted via an electromagnetic clutch 41 and an electromagnetic brake 42 to the kick-out roller 3, the take-out roller 4 and the separation roller 5.

As shown in FIG. 6, the detection system of the bill counting machine includes the bill sensor 2 for detecting whether a bill is present in the bill hopper 1, the sensor device 6 for discriminating bills, the sensor 11 for detecting bills in the bill conveying passage 7, and the stacked bill sensor 19 for detecting whether or not bills are stacked in the bill stacking section 18.

As shown in FIG. 6, the control system of the bill counting machine includes a CPU 45 for controlling the entire operation of the bill counting machine, a ROM 46 for storing reference data of bills for each denomination, and a RAM 47. The ROM 46 stores reference transmitted light amount data of bills for each denomination, reference size data of bills for each denomination, reference magnetic data of bills for each denomination, reference surface pattern data for each denomination, reference fluorescence data of bills for each denomination and the reference metal piece data of bills for each denomination as reference data.

As shown in FIG. 6, the input system of the bill counting machine includes the "PRESET" key 30, the "ADD" key 31, the "VALUE" key 32, the "CVC" key 33, the "DE" key 34, the "FUNCTION" key 35, the ten-key numeric pad 36, the "START" key 37 and the "END" key 38, and the display system of the bill counting machine includes the display section 39.

The thus constituted bill counting machine according to the preferred embodiment of the present invention counts bills in the following manner.

M bills equal to the maximum number M of bills chargeable in the bill hopper 1 are first charged in the bill hopper 1.

This embodiment of the bill counting machine will be explained with regard to operation in the successive counting mode in which after M bills equal to the maximum number M of bills chargeable in the bill hopper 1 have been charged in the bill hopper 1, N bills equal to the maximum number N of bills stackable in the bill stacking section 18 have been taken out from the bill hopper 1, the sensor device 6 has detected N bills and the counting operation of N bills has been completed, bills stacked in the bill stacking section 18 are taken out, and (M–N) bills remaining in the bill hopper 1 are successively counted. The operator selects this mode of operation by pressing the "CVC" key.

When M bills, for example, 500 bills, are set in the bill hopper 1 and the "START" key 37 is pressed, a start signal is input to the CPU 45. While a bill is present in the bill hopper 1, a bill detection signal is input from the bill sensor 2 to the CPU 45.

When the CPU 45 receives a start signal, it outputs a drive signal to the motor 40, thereby driving the motor 40. As a result, the kick-out roller 3, the take-out roller 4, the separation roller 5, the conveyor roller 9, the conveyor roller 10 and the vane wheels 15 are driven by the motor 40. The driving force of the motor 40 is intermittently transmitted via the electromagnetic clutch 41 and the electromagnetic brake 42 to the kick-out roller 3, the take-out roller 4 and the separation roller 5.

When the kick-out roller 3 is rotated, the lowermost bill abutting against the kick-out roller 3 among bills charged in the bill hopper 1 is kicked out by a frictional force between the kick-out roller 3 and the lower surface thereof toward the take-out roller.

The bill is further fed by the take-out roller 4 to the inside of the bill counting machine and two or more bills are prevented by the separation roller 5 rotated in the direction opposite to the take-out roller 4 from being simultaneously fed to the bill conveying passage 7.

The bill is then detected by the sensor device 6 to produce transmitted light amount detection data of the bill, size detection data of the bill, magnetic detection data of the bill, surface pattern detection data of the bill, fluorescence detection data of the bill and metal piece detection data of the bill, thereby outputting them to the CPU 45.

The bills are fed to the feed roller 8 one by one and are further fed by the feed roller 8 into the bill conveying passage 7.

When the CPU 45 receives these detection data from the sensor device 6, it accesses the ROM 46 and reads out from the ROM 46 the reference transmitted light amount data, the reference size data, the reference magnetic data, the reference surface pattern data, the reference fluorescence data and the reference metal piece data of bills for each denomination.

The CPU 45 compares the reference size data of bills for each denomination read out from the ROM 46 with the size detection data of the bill input from the sensor device 6 and tentatively determines the denomination of the bill.

The CPU 45 then reads out the reference transmitted light amount data corresponding to the thus tentatively determined denomination and compares them with the transmitted light amount detection data of the bill input from the sensor device 6, thereby discriminating whether bills are being conveyed one by one or whether two or more bills are being simultaneously conveyed.

When, as a result of comparing the reference transmitted light amount data corresponding to the tentatively determined denomination and the transmitted light amount detection data of the bill input from the sensor device 6, the CPU 45 discriminates that two or more bills are being simultaneously conveyed and multiple feed has occurred, it is impossible to count bills and it is necessary to collect the two or more bills being simultaneously conveyed. Therefore, the CPU 45 outputs an actuation signal to the electromagnetic clutch 41 and the electromagnetic brake 42 without counting those bills, thereby controlling them so as to prevent the driving force of the motor 40 from being transmitted to the kick-out roller 3, the take-out roller 4 and the separation roller 5 and to stop the kick-out roller 3, the take-out roller 4 and the separation roller 5.

The bills charged in the bill hopper 1 are kicked out by the kick-out roller 3 sequentially from the lowermost bill toward the take-out roller 4 and taken into the bill counting machine. However, when a bill to be collected is detected, the kick-out roller 3, the take-out roller 4 and the separation roller 5 are stopped, thereby stopping the operation of taking bills charged in the bill hopper into the bill counting machine.

The CPU 45 simultaneously outputs a display signal to the display section 39 to cause it to display that multiple feed of bills has occurred.

Further, when the sensor 11 detects two or more bills being about to be simultaneously conveyed and a detection signal is input from the sensor to the CPU 45, the CPU 45 outputs a drive signal to the solenoid 16, thereby causing it to swing the stopper 17 as indicated by a broken line in FIG. 1.

As a result, the two or more bills being about to be simultaneously conveyed are prevented by the stopper 17 from being fed into the bill stacking section 18.

When a predetermined time period has passed after the drive signal was output to the solenoid 16, the CPU 45 outputs a drive stop signal to the motor 40, thereby stopping the feed roller 8, the conveyor roller 9, the conveyor roller 10 and the drive pulley 24.

As a result, even if the two or more bills being about to be simultaneously conveyed and to be collected are fed to a portion between adjacent vanes of the pair of vane wheels 15, 15, since the pair of vane wheels 15, 15 are rotated for a predetermined time period, the two or more bills to be collected are reliably stopped while they are abutting against the stopper 17 and bills following the two or more bills to be collected are reliably stopped in a similar manner while they are abutting against the stopper 17.

As described later, the CPU 45 is constituted so that when it discriminates based on a detection signal input from the sensor device 6 that a bill to be counted is detected, it increases the count number of bills to be counted by one if the count number of bills to be counted is stored in the count memory area of the RAM 47 and to write one as the count number of bills to be counted in the count memory area of the RAM 47 if the count number is not stored there. However, after the CPU 45 has outputted a drive signal to the solenoid 16, when the sensor device 6 detects a bill following bills to be collected and a detection signal is input from the sensor device 6 to the CPU 45, the CPU 45 neither discriminates the bill nor counts the bill even when bills following bills to be collected are to be counted.

The stopper 17 is swung outside of the bill counting machine and bills abutting against the stopper 17 and stopped by the stopper 17 are located outside of the bill counting machine. Therefore, the operator can easily and reliably collect the bills to be collected and the bills following them from the bill counting machine.

When the bills to be collected and the bills following them have been collected, the operator presses the “START” key 37 and the counting of bills charged in the bill hopper 1 is restarted.

Since the bills following the bills to be collected are stopped while they are abutting against the stopper 17 and collected together with the bills to be collected, it is possible to prevent the bills following the bills to be collected from being stopped at an unexpected position in the bill conveying passage 7 and jamming when the counting of bills is restarted.

To the contrary, when the CPU 45 discriminates that the detected bills are conveyed one by one, it compares the transmitted light amount detection data of the bill, the size detection data of the bill, the magnetic detection data of the bill, the surface pattern detection data of the bill, the fluorescence detection data of the bill and the metal piece detection data of the bill input from the sensor device 6 with the reference transmitted light amount data, the reference size data of bills, the reference magnetic data, the reference surface pattern data, the reference fluorescence data of bills and the reference metal piece data of bills for each denomination read out from the ROM 46.

When, as a result of comparing the size detection data of the bill with the reference size data of bills for each denomination, the CPU 45 discriminates that the length of a long edge of the bill is longer than a reference length of bills for each denomination by greater than a predetermined ratio, for example, since if is more than 2.5 times of a reference long edge of bills for each denomination, since this means that two or more bills are being conveyed in a partially overlapped condition or that two or more bills are being conveyed with no space therebetween, there is a considerable risk of bills jamming. Therefore, such bills sometimes cannot be fed to the bill stacking section 18 or even to the stopper 17 located at the projecting position and in the case where the bills have already jammed, since they cannot be fed to the bill stacking section 18 or even to the stopper 17, the CPU 45 judges that bill jamming has occurred and outputs a drive stop signal to the motor 40 without counting those bills, thereby stopping the kick-out roller 3, the take-out roller 4, the separation roller 5, the feed roller 8, the conveyor roller 9, the conveyor roller 10 and the drive pulley 24.

At the same time, the CPU 45 outputs a display signal to the display section 39, thereby causing it to display that bill jamming has occurred.

After the kick-out roller 3, the take-out roller 4, the separation roller 5, the feed roller 8, the conveyor roller 9, the conveyor roller 10 and the drive pulley 24 have been stopped, the bill counting machine is opened and the two or more bills conveyed in partially overlapping condition, the two or more bills conveyed with no space therebetween or the jammed bills are removed by the operator.

The operator then presses the "START" key 37 and the counting of bills charged in the bill hopper 1 is restarted.

When, as a result of comparing the size detection data of the bill with the reference size data of bills for each denomination, the CPU 45 discriminates that the length of a long edge of the bill is not longer than a reference long edge length of bills for each denomination by greater than the predetermined ratio, it compares the transmitted light amount detection data of the bill, the size detection data of the bill, the magnetic detection data of the bill, the surface pattern detection data of the bill, the fluorescence detection data of the bill and the metal piece detection data of the bill input from the sensor device 6 with the reference transmitted light amount data, the reference size data of bills, the reference magnetic data, the reference surface pattern data, the reference fluorescence data of bills and the reference metal piece data of bills for each denomination read out from the ROM 46, thereby discriminating whether or not the bill detected by the sensor device 6 and the denomination thereof.

When, as a result, the CPU 45 discriminates that the bill is acceptable, it increases the count of the bill of a denomination stored in the count memory area of the RAM 47 by one and also increases the total detected number of bills stored in a predetermined memory area of the RAM 47 by one. At this time, since a first bill is detected, the CPU 45 writes one in the count memory area and the predetermined memory area of the RAM 47 as the count number of the bill of a denomination and the total detected number of bills.

This embodiment is constituted so that only a bill of a denomination first discriminated to be acceptable is counted and when the denomination of a bill is different from that of the bill first discriminated to be acceptable, the bill is not stacked in the bill stacking section 18 and is collected, even if the bill is genuine. Therefore, at the same time, the CPU 45 writes the denomination of the bill discriminated to be acceptable as a reference denomination in a predetermined memory area of the RAM 47.

The bill is further fed from the sensor device 6 into a portion between adjacent vanes of the vane wheels 15 and is then stacked in the bill stacking section 18.

To the contrary, when the CPU 45 discriminates that the bill detected by the sensor device 6 is an unacceptable bill such as a counterfeit bill, a foreign bill or the like, it outputs an actuation signal to the electromagnetic clutch 41 and the electromagnetic brake 42, without counting the unacceptable bill or increasing the total detected number of bills stored in a predetermined memory area of the RAM 47, to control them so that the driving force of the motor 40 is not transmitted to the kick-out roller 3, the take-out roller 4 and the separation roller 5, thereby stopping the kick-out roller 3, the take-out roller 4 and the separation roller 5.

At the same time, the CPU 45 outputs a display signal to the display section 39, thereby causing it to display that an unacceptable bill has been detected.

When the sensor 11 detects an unacceptable bill and sends a detection signal to the CPU 45, the CPU 45 further outputs a drive signal to the solenoid 16, thereby causing it to swing the stopper 17 to the projecting position as indicated by a broken line in FIG. 1.

As a result, the unacceptable bill is prevented by the stopper 17 from being fed into the bill stacking section 18.

When a predetermined time period has passed after the CPU 45 outputted the drive signal to the solenoid 16, the CPU 45 outputs a drive stop signal to the motor 40, thereby stopping the feed roller 8, the conveyor roller 9, the conveyor roller 10 and the drive pulley 24.

As a result, even if the unacceptable bill to be collected is fed to a portion between adjacent vanes of the pair of vane wheels 15, 15, the bill to be collected is reliably stopped while it is abutting against the stopper 17 and bills following the bill to be collected are reliably stopped while they are abutting against the stopper 17.

When the bills abutting against the stopper 17 and stopped by the stopper 17 have been collected and the bill to be collected and the bills following it have been collected, the operator presses the "START" key 37 and the counting of bills charged in the bill hopper 1 is restarted.

With regard to a bill taken out one by one by the kick-out roller 3 and the take-out roller 4 into the bill conveying passage 7 after a bill was first discriminated to be acceptable by the CPU 45 and the denomination of the bill was written as a reference denomination in the RAM 47, the CPU 45 discriminates, based on the detection data of bills detected by the sensor device 6 and the reference data of bills for each denomination read out from the ROM 46, whether or not the denomination of the bill coincides with the reference denomination stored in the RAM 47, namely, the denomination of the bill first discriminated to be acceptable, in addition to discriminating whether or not multiple feed has occurred, whether or not bill jamming has occurred and whether or not the bill is acceptable.

More specifically, when the CPU 45 discriminates based on the detection data of bills detected by the sensor device 6 and the reference data of bills for each denomination read out from the ROM 46 that neither multiple feed of bills nor bill jamming has occurred and that the bill is acceptable, it further accesses the RAM 47 to read out the reference denomination written in the RAM 47 and discriminates whether or not the reference denomination coincides with the denomination of the bill.

When, a result, the CPU 45 discriminates that the denomination of the bill coincides with the reference denomination written in the RAM 47, it increases the count number of the denomination stored in the count memory area of the RAM 47 by one and also increases the total detected number of bills stored in a predetermined memory area of the RAM 47 by one and then feeds the bill to the bill stacking section 18, thereby stacking it.

To the contrary, when the CPU 45 discriminates that the denomination of the bill does not coincide with the reference denomination written in the RAM 47, it increases the count number of the denomination of the bill by one if the count number of the denomination is stored in the count memory area of the RAM 47 and writes one as the count number of the denomination in the count memory area of the RAM 47 if the count number is not stored there. The CPU 45 then outputs an actuation signal to the electromagnetic clutch 41 and the electromagnetic brake 42, without increasing the total detected number of bills stored in a predetermined memory area of the RAM 47, to control them so that the driving force of the motor 40 is not transmitted to the kick-out roller 3, the take-out roller 4 and the separation roller 5, thereby stopping the kick-out roller 3, the take-out roller 4 and the separation roller 5.

At the same time, the CPU 45 outputs a display signal to the display section 39, thereby causing it to display that a bill of a denomination different from the reference denomination has been detected.

When the sensor 11 detects the bill of a denomination different from the reference denomination and sends a detection signal to the CPU 45, the CPU 45 further outputs a drive signal to the solenoid 16, thereby causing it to swing the stopper 17 to the projecting position as indicated by a broken line in FIG. 1.

As a result, the bill of a denomination different from the reference denomination is prevented by the stopper 17 from being fed into the bill stacking section 18.

When a predetermined time period has passed after the CPU 45 outputted the drive signal to the solenoid 16, the CPU 45 outputs a drive stop signal to the motor 40, thereby stopping the feed roller 8, the conveyor roller 9, the conveyor roller 10 and the drive pulley 24.

As a result, even if the bill of a denomination different from the reference denomination and to be collected is fed to a portion between adjacent vanes of the pair of vane wheels 15, 15, the bill a of denomination different from the reference denomination is reliably stopped while it is abutting against the stopper 17 and bills following the bill of a denomination different from the reference denomination are reliably stopped while they are abutting against the stopper 17.

When the bills abutting against the stopper 17 and stopped by the stopper 17 have been collected and the bill of a denomination different from the reference denomination and the bills following it have been collected, the operator presses the "START" key 37 and the counting of bills charged in the bill hopper 1 is restarted.

To the contrary, when the CPU 45 discriminates that the length of a long edge of a bill taken out one by one by the kick-out roller 3 and the take-out roller 4 into the bill conveying passage 7 after a bill was first discriminated to be acceptable and the denomination of the bill was written in the RAM 47 as a reference denomination is longer than a reference long edge length of bills for each denomination by greater than a predetermined ratio, since this means that that two or more bills are being conveyed in a partially overlapped condition or that two or more bills are being conveyed with no space therebetween, there is a considerable risk of bills jamming or a risk that bills have already jammed. Therefore, the CPU 45 judges that bill jamming has occurred and outputs a drive stop signal to the motor 40 without counting those bills, thereby stopping the kick-out roller 3, the take-out roller 4, the separation roller 5, the feed roller 8, the conveyor roller 9, the conveyor roller 10 and the drive pulley 24.

At the same time, the CPU 45 outputs a display signal to the display section 39, thereby causing it to display that bill jamming has occurred.

The bill counting machine is then opened and the two or more bills conveyedin a partially overlapping condition, the two or more bills conveyed with no space therebetween or the jammed bills are removed by the operator and bills of the reference denomination stacked in the bill stacking section 18 are collected from the bill stacking section 18.

In the case where bill jamming has occurred, the total detected number of bills and the bill count of bills for each denomination stored in the count memory area of the RAM 47 are both unreliable. Therefore, when all bills of the reference denomination have been removed from the bill stacking section 18 so that the stacked bill sensor 19 does not detect any bill stacked in the bill stacking section 18 and a detection signal is no longer input from the stacked bill sensor 19 to the CPU 45, the CPU 45 resets the total count number of bills stored in a predetermined memory area of the RAM 47 to zero, also resets the count number of bills for each denomination stored in the count number memory area of the RAM 47 to zero, and restarts the counting of bills.

On the other hand, when the CPU 45 discriminates that a bill taken out one by one by the kick-out roller 3 and the take-out roller 4 into the bill conveying passage 7 after the bill was first discriminated to be acceptable by the CPU 45 and the denomination of the bill was written as a reference denomination in the RAM 47 is unacceptable, it outputs an actuation signal to the electromagnetic clutch 41 and the electromagnetic brake 42, without counting the unacceptable bill and without increasing the total detected number of bills stored in a predetermined memory area of the RAM 47, to control them so that the driving force of the motor 40 is not transmitted to the kick-out roller 3, the take-out roller 4 and the separation roller 5, thereby stopping the kick-out roller 3, the take-out roller 4 and the separation roller 5.

At the same time, the CPU 45 outputs a display signal to the display section 39, thereby causing it to display that an unacceptable bill has been detected.

When the sensor 11 detects the unacceptable bill and sends a detection signal to the CPU 45, the CPU 45 further outputs a drive signal to the solenoid 16, thereby causing it to swing the stopper 17 to the projecting position as indicated by a broken line in FIG. 1. As a result, the unacceptable bill is prevented by the stopper 17 from being fed into the bill stacking section 18.

When a predetermined time period has passed after the CPU 45 outputted the drive signal to the solenoid 16, the CPU 45 outputs a drive stop signal to the motor 40, thereby stopping the feed roller 8, the conveyor roller 9, the conveyor roller 10 and the drive pulley 24.

When the bills abutting against the stopper 17 and stopped by the stopper 17 have been collected and the bill to be collected and the bills following it have been collected, the operator presses the "START" key 37 and the counting of bills charged in the bill hopper 1 is restarted.

In this case, only the bill discriminated to be unacceptable and bills following it are collected, while bills of the reference denomination stacked in the bill stacking section 18 are not collected and the bill discriminated to be unacceptable and bills following it are not counted. Therefore, it can be considered that the counting of bills was normally performed before the unacceptable bill was detected. Accordingly, when the operator uses the "START" key 37 to restart the counting of bills, the CPU 45 does not reset either the total count number of bills or the count number of bills for each denomination stored in the memory areas of the RAM 47 to zero and the value of the total count number of bills and the count number of bills for each denomination stored in the memory areas of the RAM 47 are held so that the counting of bills is restarted. However, when it can be considered that the bill discriminated to be unacceptable was erroneously discriminated, the counting of bills may be restarted by charging the bill again in the bill hopper 1 and pressing the "START" key 37.

To the contrary, after the bill was first discriminated to be acceptable and the denomination of the bill was written in the RAM 47 as the reference denomination, when the CPU 45 detects that two or more bills are being simultaneously conveyed, it outputs an actuation signal to the electromagnetic clutch 41 and the electromagnetic brake 42, without counting those bills and without increasing the total detected number of bills stored in a predetermined memory area of the RAM 47, to control them so that the driving force of the motor 40 is not transmitted to the kick-out roller 3, the take-out roller 4 and the separation roller 5, thereby stopping the kick-out roller 3, the take-out roller 4 and the separation roller 5.

At the same time, the CPU 45 outputs a display signal to the display section 39, thereby causing it to display that multiple feed of bills has occurred.

When the sensor 11 detects the two or more bills being simultaneously conveyed and sends a detection signal to the CPU 45, the CPU 45 further outputs a drive signal to the solenoid 16, thereby causing it to swing the stopper 17 to the projecting position as indicated by a broken line in FIG. 1. As a result, the two or more bills being simultaneously conveyed are prevented by the stopper 17 from being fed into the bill stacking section 18.

When a predetermined time period has passed after the CPU 45 outputted the drive signal to the solenoid 16, the CPU 45 outputs a drive stop signal to the motor 40, thereby stopping the feed roller 8, the conveyor roller 9, the conveyor roller 10 and the drive pulley 24.

When the bills abutting against the stopper 17 and stopped by the stopper 17 have been collected and the bills to be collected and the bills following them have been collected, the operator presses the "START" key 37 and the counting of bills charged in the bill hopper 1 is restarted.

In this case, only the two or more bills being simultaneously conveyed and the bills following them are collected, while bills of the reference denomination stacked in the bill stacking section 18 are not collected, and though the number of bills that were being simultaneously conveyed cannot be judged, the collected bills are not counted. Further, it can be considered that the counting of bills was normally performed before multiple feed was detected. Therefore, the CPU 45 does not reset either the total count number of bills or the count number of bills for each denomination stored in the memory areas of the RAM 47 to zero and while the value of the total count number of bills and the count number of bills for each denomination stored in the memory areas of the RAM 47 are held, the counting of bills is restarted by pressing of the "START" key 37 by the operator. In the above described manner, bills charged in the bill hopper 1 are sequentially discriminated, counted and fed to the bill stacking section 18. Then, when the CPU 45 judges, as a result of the detection of bills by the sensor device 6 without any detection of bill jamming in the bill counting machine, that the total detected number of bills stored in a predetermined memory area of the RAM 47 has become N, i.e., equal to the stacked bill capacity of the bill stacking section 18 (e.g., 200 bills), and such number of bills N equal to the stacked bill capacity of the bill stacking section 18 (e.g., 200 bills) have been stacked in the bill stacking section 18, it outputs an actuation signal to the electromagnetic clutch 41 and the electromagnetic brake 42 to control them so that the driving force of the motor 40 is not transmitted to the kick-out roller 3, the take-out roller 4 and the separation roller 5, thereby stopping the kick-out roller 3, the take-out roller 4 and the separation roller 5 and preventing a 201st bill from being taken out from the bill hopper 1 into the bill conveying passage 7 and further outputs a drive stop signal to the motor 40 at the time the 200th bill is fed into the bill stacking section 18, thereby stopping the feed roller 8, the conveyor roller 9, the conveyor roller 10 and the drive pulley 24 and completing a first bill counting cycle.

At the same time, the CPU 45 reads out the number of bills for each denomination stored in the count memory area of the RAM 47 and, if the "VALUE" key 32 has not been pressed by the operator, displays the number of bills for each denomination and the total number of bills on the display section 39 of the operation panel 20. On the other hand, when the "VALUE" key 32 and the "DE" key 33 have been pressed by the operator to select the bill value display mode and the mode for displaying the value of the bills for each denomination, the CPU 45 calculates the count values of the bills for each denomination and displays them on the display section 39 of the operation panel 20. Further, when the bill value display mode and the mode for displaying the total value of counted bills have been selected, the CPU 45 calculates the total value of the counted bills and display it on the display section 39.

When, after confirming the number of counted bills for each denomination and the total number of counted bills or the bill value for each denomination and the total bill value, the operator collects the bills of the reference denomination stacked in the bill stacking section 18, the stacked bill sensor 19 detects that the bills of the reference denomination stacked in the bill stacking section 18 have been collected and sends a collection completion signal to the CPU 45.

In this embodiment, although bills of denominations different from the reference denomination are counted, when a bill of a denomination different from the reference denomination is detected, the stopper 17 is swung to the projecting position, whereby the bill of the denomination different from the reference denomination can be collected by the operator together with a bill following it and the collected bills are saved separately. Therefore, only bills of the reference denomination are stacked in the bill stacking section 18 when the first discrimination and counting cycle is completed.

Further, in this embodiment, the operator can select a successive counting mode by pressing the "CVC" key 33 and the maximum number M of bills chargeable in the bill hopper 1, namely, the bill capacity M of the bill hopper 1 is greater than the maximum number N of bills stackable in the bill stacking section 18, namely, the stacked bill capacity N of the bill stacking section 18. Therefore, when, as a result of bills being sequentially taken out from the bill hopper 1 and detected by the sensor device 6, the total detected number of bills stored in a predetermined memory area of the RAM 47 becomes equal to the number N of bills stackable in the bill stacking section 18 and N number of bills equal to the stacked bill capacity of the bill stacking section 18 are stacked in the bill stacking section 18, thereby completing the first discrimination and counting cycle, bills which have not yet been counted may be present in the bill hopper 1. In this embodiment, since a bill detection signal continues to be output from the bill sensor 2 to the CPU 45 while a bill is present in the bill hopper 1, the CPU 45 can judge based on the bill detection signal input from the bill sensor 2 whether or not a bill which has not yet been counted is present in the bill hopper 1.

Therefore, if at the time a collection completion signal is input from the stacked bill sensor 19*a* bill detection signal is being input from the bill sensor 2, the CPU 45 judges that a bill which has not yet been counted is present in the bill hopper 1 and performs a second discrimination and counting cycle.

More specifically, the CPU 45 stores the number of bills for each denomination stored in the count memory area of the RAM 47 as a tentative count in a tentative count memory area which is another memory area of the RAM 47 and then outputs a drive signal to the motor 40, thereby automatically starting a second discrimination and counting cycle by employing the bill count of bills for each denomination stored in the count memory area of the RAM 47 as an initial value and restarting the counting of bills remaining in the bill hopper 1. Prior to starting the second discrimination and counting cycle, the CPU 45 resets the total detected number of bills stored in a predetermined memory area of the RAM 47 to zero.

As in the first discrimination and counting cycle, after the counting of bills charged in the bill hopper 1 has been restarted, when the CPU 45 judges, as a result of the detection of bills by the sensor device 6 without detection of bill jamming in the bill counting machine, that the total detected number of bills stored in a predetermined memory area of the RAM 47 has become equal to N, i.e., equal to the stacked bill capacity of the bill stacking section 18 (e.g., 200), and such number of N bills equal to the stacked bill capacity of the bill stacking section 18 (e.g., 200 bills) have been stacked in the bill stacking section 18, the CPU 45 outputs an actuation signal to the electromagnetic clutch 41 and the electromagnetic brake 42 to control them so that the driving force of the motor 40 is not transmitted to the kick-out roller 3, the take-out roller 4 and the separation roller 5, thereby stopping the kick-out roller 3, the take-out roller 4 and the separation roller 5 and preventing a 201st bill from being taken out from the bill hopper 1 into the bill conveying passage 7 and further outputs a drive stop signal to the motor 40 at the time the 200th bill is fed into the bill stacking section 18, thereby stopping the feed roller 8, the conveyor roller 9, the conveyor roller 10 and the drive pulley 24 and completing the second discrimination and counting cycle.

Thus, as in the first discrimination and counting cycle, when the second discrimination and counting cycle is completed, the CPU 45 displays the results of bill counting on the display section 39.

If at the time the operator removes the N bills counted and stacked in the bill stacking section 18 causing a collection completion signal to be input to the CPU 45 from the stacked bill sensor 19, a bill detection signal is being input from the bill sensor 2, the CPU 45 judges that bills which have not yet been counted remain in the bill hopper 1 and therefore overwrites the tentative bill count of bills for each denomination obtained by the first discrimination and counting cycle and stored in the tentative count memory area of the RAM 47 with the number of bills for each denomination stored in a predetermined memory area of the RAM 47 at the second discrimination and counting cycle by taking out bills from the bill hopper 1 and counting until the total detected number of bills stored in a predetermined memory area becomes equal to N, thereby updating the tentative bill count of bills for each denomination and storing them in the tentative count memory area of the RAM 47.The CPU 45 then outputs a drive signal to the motor 40 to automatically start a third discrimination and counting cycle by employing the bill count stored in the count memory area of the RAM 47 as an initial value, thereby restarting the counting of bills charged in the bill hopper 1.

Thus, the counting of bills is performed until the bill sensor 2 no longer detects bills charged in the bill hopper 1. When the bill sensor 2 no longer detects bills charged in the bill hopper 1 and a bill detection signal is no longer input to the CPU 45 from the bill sensor 2, the CPU 45 completes the counting of bills.

Upon confirming that no bill is present in the bill hopper 1 and that there is no bill to be further counted, the operator presses the "END" key 38 of the operation panel 20. As a result, a counting completion signal is output to the CPU 45.

When the CPU 45 receives the counting completion signal, it determines the final number of bills for each denomination stored in the count memory area of the RAM 47 as a bill count. At the same time, the CPU 45 clears the tentative count stored in the tentative count memory area of the RAM 47.

When the bill count has been finally determined, and if the "VALUE" key 32 has not be pressed by the operator, the CPU 45 reads the finally determined number of bills for each denomination stored in the RAM 47 and displays the number of bills for each denomination and the total number of bills on the display section 39 of the operation panel 20. On the other hand, when the "VALUE" key 32 and the "DE" key 33 have been pressed by the operator to select the bill value display mode and the mode for displaying the value of bills for each denomination, the CPU 45 calculates the values of bills for each denomination and displays them on the display section 39 of the operation panel 20. Further, when the bill value display mode and the mode for displaying the total amount of the counted bills have been selected, the CPU 45 calculates the total value of the counted bills and displays it on the display section 39.

To the contrary, when the CPU 45 discriminates that the length of a long edge of a bill taken out one by one by the kick-out roller 3 and the take-out roller 4 into the bill conveying passage 7 after the first bill counting cycle is longer than a reference long edge length of bills for each denomination by greater than a predetermined ratio, since this means that two or more bills are being conveyed in a partially overlapped condition or that two or more bills are being conveyed with no space therebetween, there is a considerable risk of bills jamming or that bills have already jammed. Therefore, the CPU 45 immediately outputs a drive stop signal to the motor 40, thereby stopping the kick-out roller 3, the take-out roller 4, the separation roller 5, the feed roller 8, the conveyor roller 9, the conveyor roller 10 and the drive pulley 24.

At the same time, the CPU 45 outputs a display signal to the display section 39, thereby causing it to display that bill jamming has occurred.

The bill counting machine is then opened and the two or more bills conveyed in a partially overlapped condition, the two or more bills conveyed with no space therebetween or the jammed bills are removed by the operator and all bills stacked in the bill stacking section 18 are collected from the bill stacking section 18.

In this case, since the results of the counting operation performed so far are not reliable, all bills stacked in the bill stacking section 18 are collected and when a stacked bill detection signal is no longer input to the CPU 45 from the stacked bill sensor 19, the CPU 45 resets the total detected number of bills and the count number of bills for each denomination stored in the RAM 47 and restarts the counting of bills.

At this time, since the tentative bill count is stored in the tentative count memory area of the RAM 47, the CPU reads out the tentative count, stores it as an initial value in the count memory area and restarts the counting of bills.

According to the above described embodiment, when the CPU 45 judges that two or more bills are being simultaneously conveyed and multiple feed has occurred, when the CPU 45 detects an unacceptable bill and when the CPU 45 detects a bill of a denomination different from the reference denomination, it outputs an actuation signal to the electromagnetic clutch 41 and the electromagnetic brake 42 to control them so that the driving force of the motor 40 is not transmitted to the kick-out roller 3, the take-out roller 4 and the separation roller 5, thereby stopping the kick-out roller 3, the take-out roller 4 and the separation roller 5. Therefore, it is possible not only to collect the bill or bills to be collected, i.e., bills following the bills being multiply fed, the unacceptable bill or the bill of a denomination different from the reference denomination, but also possible to prevent further bills charged in the bill hopper 1 from being taken out into the bill counting machine. Further, in the above described embodiment, when the CPU 45 receives a detection signal from the sensor 11 after the kick-out roller 3, the take-out roller 4 and the separation roller 5 were stopped,it outputs a drive signal to the solenoid 16, thereby swinging the stopper 17 to the projecting position and when a predetermined time period has passed after the CPU outputted a drive signal to the solenoid 16, it outputs the drive stop signal to the motor 40, thereby stopping the feed roller 8, the conveyor roller 9, the conveyor roller 10 and the drive pulley 24. Therefore, even when bills to be collected and bills following them are fed to a portion between adjacent vanes of the pair of vane wheels 15, 15, the pair of vane wheels 15, 15 are rotated so that the bills to be collected and the bills following them can be reliably stopped by causing them to abut against the stopper 17 and be collected. As a result, according to the above described embodiment, it is possible to reliably prevent bills following bills to be collected from stopping at an unexpected position in the bill conveying passage 7 and jamming when the counting of bills is restarted.

Further, according to the above described embodiment, since the stopper 17 is swung outside of the bill counting machine and, therefore, bills abutting against the stopper 17 swung to the projecting position and stopped thereby are located outside of the bill counting machine, the operator can easily and reliably collect bills to be collected and bills following them from the bill counting machine.

Furthermore, according to the above described embodiment, when, after judging that two or more bills are being simultaneously conveyed and multiple feed has occurred, the CPU 45 detects an unacceptable bill or the CPU 45 detects a bill of a denomination different from the reference denomination, it does not count these bills to be collected and the bills following them but stops them by causing them to abut against the stopper 17 swung to the projecting position, thereby enabling them to be collected. Therefore, when the CPU 45 judges that two or more bills are being simultaneously conveyed and multiple feed has occurred, when the CPU 45 detects an unacceptable bill and when the CPU 45 detects a bill of a denomination different from the reference denomination, once these bills to be collected and the bills following them have been collected, it is possible to continue the counting operation using the results of the counting of bills performed so far and it is unnecessary to to recount bills. As a result, the efficiency of the counting of bills can be markedly improved.

Moreover, according to the above described embodiment, when, after judging that two or more bills are being simultaneously conveyed and multiple feed has occurred, the CPU 45 detects an unacceptable bill or the CPU 45 detects a bill of a denomination different from the reference denomination, it is possible to collect the bills being multiply fed, the unacceptable bill or the bill of the denomination different from the reference denomination without providing any separate means for collecting them, because these bills to be collected and the bills following them are stopped by causing them to abut against the stopper 17 swung to the projecting position, thereby enabling their collection. The bill counting machine can therefore be made compact.

Further, according to the above described embodiment, since the stopper 17 is formed of a flexible material such as a piano wire so as to be frame-like, the stopper 17 can be quickly moved by the solenoid 16 to the projecting position. Therefore, bills to be collected and bills following them can be reliably collected by causing them to abut against the stopper 17 swung to the projecting position and stopping them.

Furthermore, according to the above described embodiment, since the stopper 17 is formed of a flexible material such as a piano wire so as to be frame-like, it is possible to easily collect bills to be collected and bills following them which abut against the stopper 17 and are stopped thereby.

Moreover, according to the above described embodiment, since bills having denominations different from the reference denomination are counted together with bills of the reference denomination and the number thereof is stored in the count memory area of the RAM 47, the number of bills for each denomination and the total number of bills or the value of bills for each denomination and a total value of bills can be efficiently counted by charging bills of various denominations in the bill hopper 1. Further, since bills of denominations different from the reference denomination abut against the stopper 17 and are stopped, thereby being collected, bills of various denominations can be sorted for each denomination by saving the bills of denominations different from the reference denomination separately from the bills of the reference denomination.

Further, according to the above described embodiment, the bill counting machine is constituted so that the number N of bills stackable in the bill stacking section 18 is less than the number M of bills chargeable in the bill hopper 1 and so as to discriminate and count bills as one discrimination and counting cycle during a period when bills are sequentially taken out from the bill hopper 1 and detected by the sensor device 6 until the total detected number of bills stored in a predetermined memory area of the RAM 47 becomes equal to the number N of bills stackable in the bill stacking section 18, in other words, until bills whose number is equal to the number N of bills stackable in the bill stacking section 18 have been stacked in the bill stacking section 18, to store the number of bills counted in a first discrimination and counting cycle for each denomination in the tentative count memory area of the RAM 47 as a tentative count after the first discrimination and counting cycle, and to overwrite the tentative count stored in the tentative count memory area of the RAM 47 with the bill count stored in the count memory area of the RAM 47 every time one discrimination and counting cycle is completed, thereby updating the tentative count. Therefore, since the tentative count memory area of the RAM 47 stores the number of bills for each denomination counted in the previous discrimination and counting cycle, even in the case where bill jamming occurs and the number of jammed bills cannot be judged, it is possible to very efficiently count the bills, without recounting all bills, by again setting the bills counted and stacked in the bill stacking section 18 during the cycle in the bill hopper 1 and recounting the bills reset in the bill hopper 1 using the tentative bill count stored in the tentative count memory area of the RAM 47 as an initial value.

Figure 7:
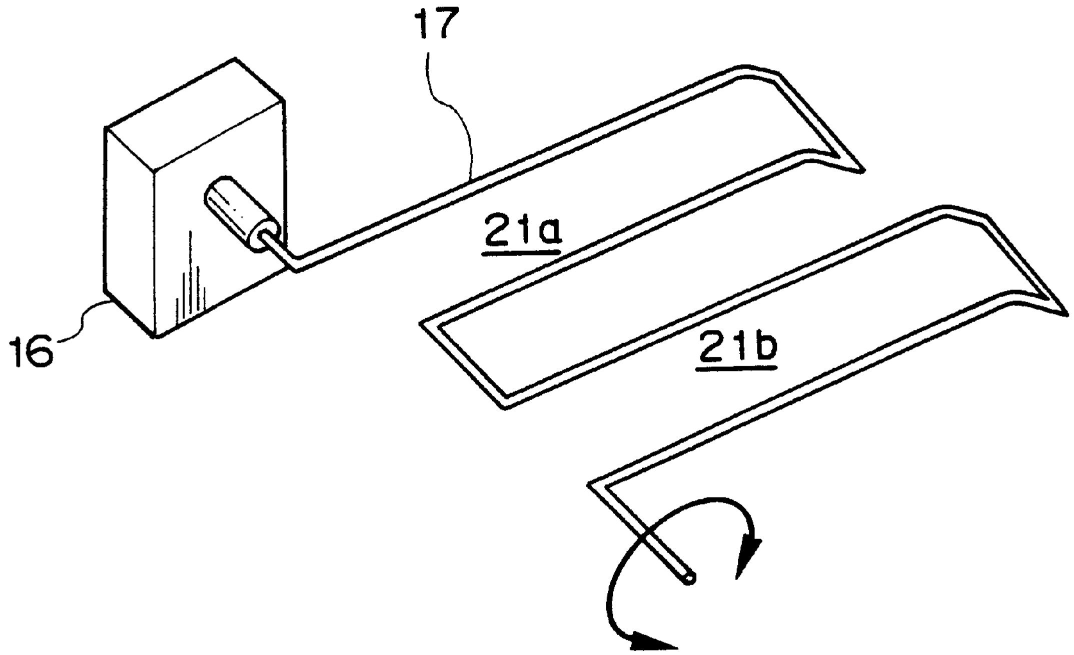
FIG. 7 is a schematic perspective view showing a stopper used in a bill counting machine which is another preferred embodiment of the present invention.
Figure 8:
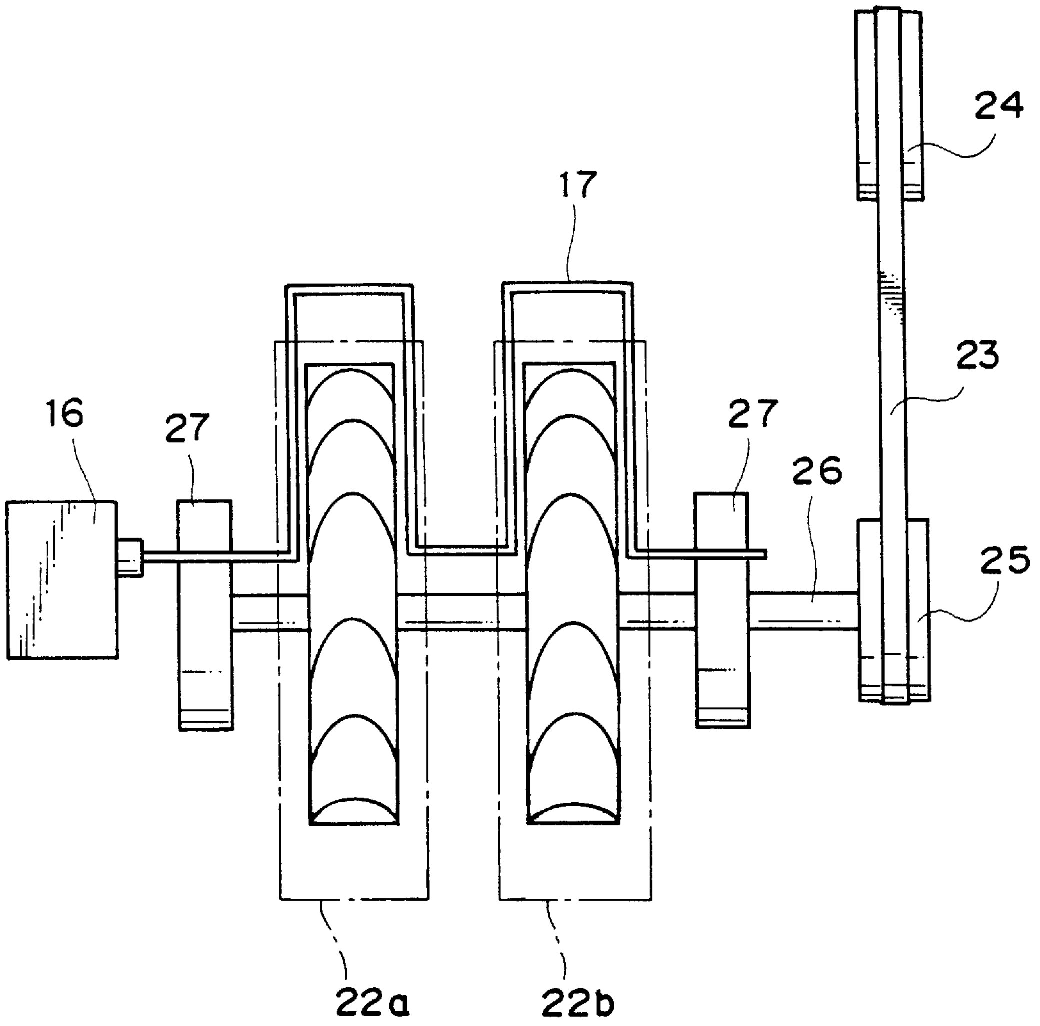
FIG. 8 is a schematic plan view showing the principal part of a stopper held at a retracted position, a pair of vane wheels and a solenoid in a bill counting machine which is another preferred embodiment of the present invention.
Figure 9:
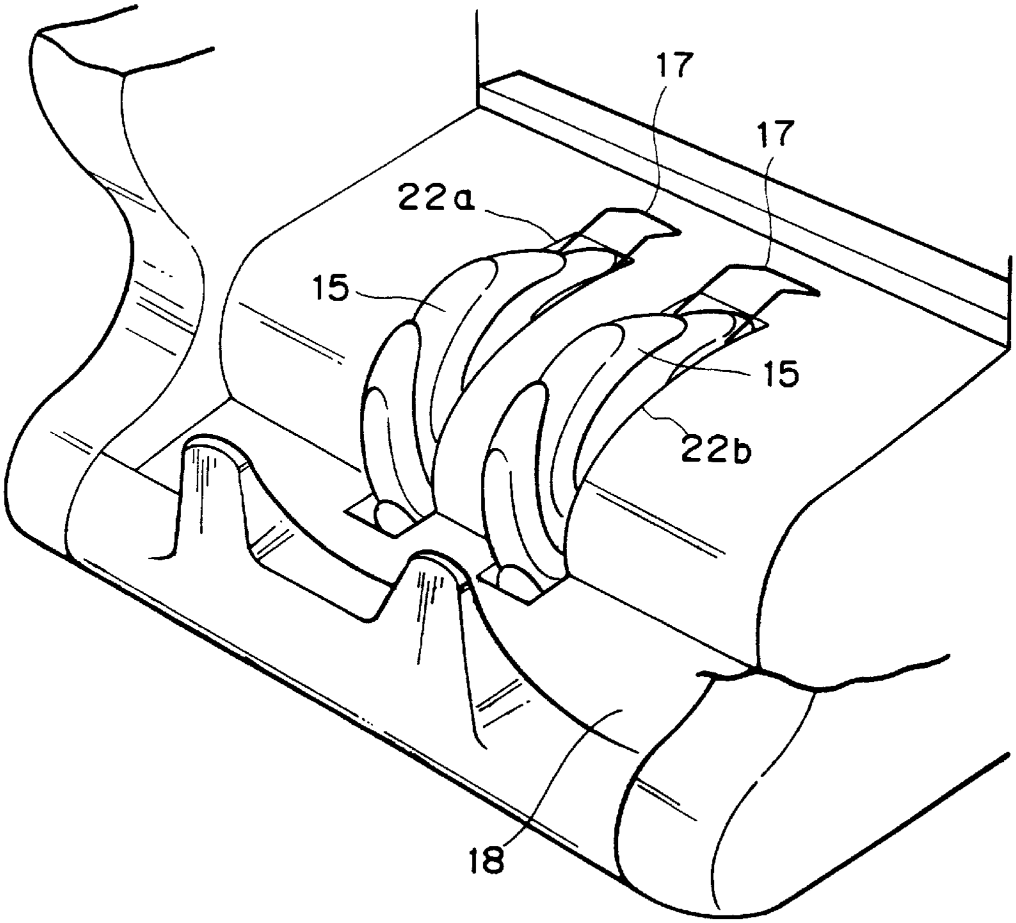
FIG. 9 is a schematic perspective view showing a bill counting machine which is another preferred embodiment of the present invention.

FIG. 7 is a schematic perspective view showing a stopper used in a bill counting machine which is another preferred embodiment of the present invention. FIG. 8 is a schematic plan view showing the principal part of a stopper held at a retracted position, a pair of vane wheels and a solenoid, and FIG. 9 is a schematic perspective view showing a bill counting machine which is another preferred embodiment of the present invention.

As shown in FIG. 7, a stopper 17 used in the bill counting machine according to this embodiment is formed of a flexible material such as a piano wire so as to be frame-like and have two substantially rectangular openings 21*a* and 21*b*.

As shown in FIG. 8, in this embodiment, the pair of vane wheels 15, 15 are disposed one in each of the two substantially rectangular openings 21*a* and 21*b* formed by the stopper 17. As shown in FIG. 9, the outer wall of the bill counting machine according to this embodiment is formed with two openings 22*a* and 22*b* and the stopper 17 held at the retracted position and the pair of vane wheels 15, 15 are disposed so as to be exposed to the outside of the bill counting machine via the openings 22*a*, 22*b* formed in the outer wall of the bill counting machine and the stopper 17 is swingable outside of the bill counting machine.

Other structural features are the same as those of the embodiment shown in FIGS. 1 to 6.

According to this embodiment, when, after judging that two or more bills are being simultaneously conveyed and multiple feed has occurred, the CPU 45 detects an unacceptable bill or the CPU 45 detects a bill of a denomination different from the reference denomination, it first outputs an actuation signal to the electromagnetic clutch 41 and an electromagnetic brake 42 to control them so that the driving force of the motor 40 is not transmitted to the kick-out roller 3, the take-out roller 4 and the separation roller 5, thereby stopping the kick-out roller 3, the take-out roller 4 and the separation roller 5. Therefore, it is not only possible to collect the bills to be collected, i.e., bills following the bills being multiply fed, the unacceptable bill or the bill of the denomination different from the reference denomination, but also possible to prevent further bills charged in the bill hopper 1 from being taken out into the bill counting machine. Further, in the above described embodiment, when the CPU 45 receives a detection signal from the sensor 11 after the kick-out roller 3, the take-out roller 4 and the separation roller 5 were stopped,it outputs a drive signal to the solenoid 16, thereby swinging the stopper 17 to the projecting position and when a predetermined time period has passed after the CPU outputted the drive signal to the solenoid 16, it outputs a drive stop signal to the motor 40, thereby stopping the feed roller 8, the conveyor roller 9, the conveyor roller 10 and the drive pulley 24. Therefore, even when bills to be collected and bills following them are fed to a portion between adjacent vanes of the pair of vane wheels 15, 15, the pair of vane wheels 15, 15 are rotated so that the bills to be collected and the bills following them can be reliably stopped by causing them to abut against the stopper 17 and be collected. As a result, according to the above described embodiment, it is possible to reliably prevent bills following bills to be collected from stopping at an unexpected position in the bill conveying passage 7 and jamming when the counting of bills is restarted.

Figure 10:
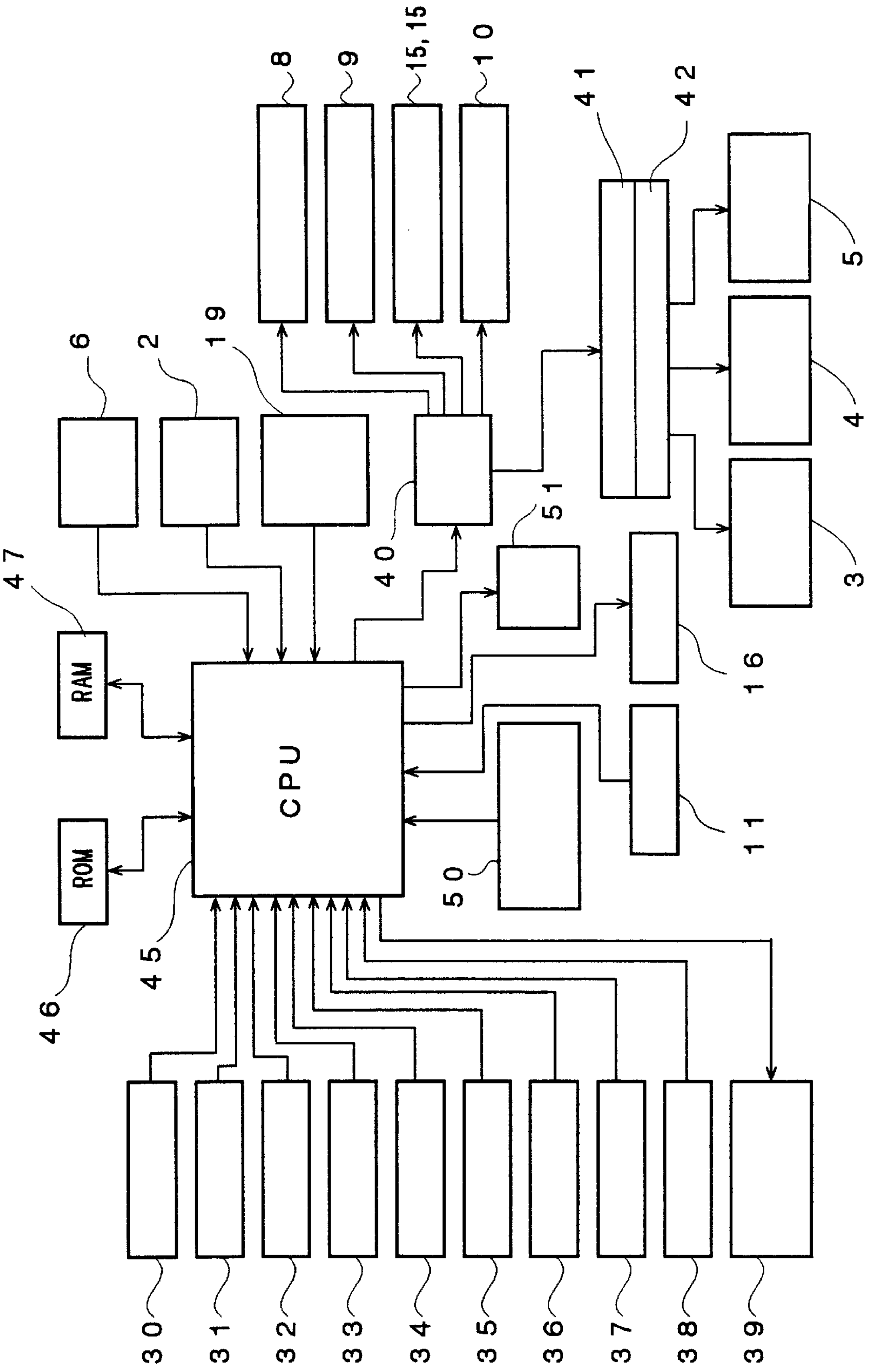
FIG. 10 is a block diagram of a drive system, a detection system, a control system, an input system and a display system of a bill counting machine, which is a further preferred embodiment of the present invention.

FIG. 10 is a block diagram of a drive system, a detection system, a control system, an input system and a display system of a bill counting machine, which is a further preferred embodiment of the present invention.

As shown in FIG. 10, similarly to the bill counting machine according to the previous embodiment shown in FIGS. 1 to 6, the drive system of the bill counting machine which is a further preferred embodiment of the present invention includes the kick-out roller 3, the take-out roller 4, the separation roller 5, the feed roller 8, the conveyor roller 9, a motor 40 for driving the conveyor roller 10 and the drive pulley 24, and the solenoid 16 for driving the stopper 17. The driving force of the motor 40 is intermittently transmitted via an electromagnetic clutch 41 and an electromagnetic brake 42 to the kick-out roller 3, the take-out roller 4 and the separation roller 5.

As shown in FIG. 10, similarly to the bill counting machine according to the previous embodiment shown in FIGS. 1 to 6, the detection system of the bill counting machine according to this embodiment includes the bill sensor 2 for detecting whether a bill is present in the bill hopper 1, the sensor device 6 for discriminating bills, the sensor 11 for detecting bills in the bill conveying passage 7, and the stacked bill sensor 19 for detecting whether or not bills are stacked in the bill stacking section 18.

As shown in FIG. 10, similarly to the bill counting machine according to the previous embodiment shown in FIGS. 1 to 6, the control system of the bill counting machine according to this embodiment includes the CPU 45 for controlling the entire operation of the bill counting machine, the ROM 46 for storing reference data of bills for each denomination, and the RAM 47.

As shown in FIG. 10, similarly to the bill counting machine according to the previous embodiment shown in FIGS. 1 to 6, the input system of the bill counting machine according to this embodiment includes the "PRESET" key 30, the "ADD" key 31, the "VALUE" key 32, the "CVC" key 33, the "DE" key 34, the "FUNCTION" key 35, the ten-key numeric pad 36, the "START" key 37 and the "END" key 38, and further includes a denomination setting means 50 capable of specifying a reference denomination. The display system of the bill counting machine includes the display section 39 and an alarm means 51.

The bill counting machine according to this embodiment is constituted so that a reference denomination is not determined by the CPU 45 as the denomination of the bill first discriminated to be acceptable and is not written in the RAM 47 but that a reference denomination is specified by the operator through the denomination setting means 50 and is written in the RAM 47 by the CPU 50. The functions of the bill counting machine are the same as those of the bill counting machine according to the previous embodiment shown in FIGS. 1 to 6 except that when bill jamming has occurred, when two or more bills are being simultaneously conveyed and multiple feed has occurred, when an unacceptable bill has been detected or when a bill of a denomination different from the reference denomination has been detected, the CPU 45 displays such information on the display section 39 and outputs an alarm signal to the alarm means 51, thereby causing it to generate an alarm sound to inform the operator of the fact that bill jamming has occurred, that two or more bills are being simultaneously conveyed and multiple feed has occurred, that an unacceptable bill has been detected or that a bill of a denomination different from the reference denomination has been detected.

The present invention has thus been shown and described with reference to specific embodiments. However, it should be noted that the present invention is in no way limited to the details of the described arrangements but changes and modifications may be made without departing from the scope of the appended claims.

For example, the CPU 45 determines the denomination of the bill first discriminated to be acceptable as a reference denomination and writes it in the RAM 47 in the embodiment shown in FIGS. 1 to 6 and the operator specifies a reference denomination and causes the CPU 45 to write it in the RAM 47 in the embodiment shown in FIG. 10. However, in the embodiment shown in FIGS. 1 to 6, the bill counting machine may be constituted to have a denomination setting means 50 and when the operator specifies a reference denomination through the denomination setting means 50, the reference denomination specified by the operator is written in the RAM 47 by the CPU 45 in order to respect the operator's intention and when the operator does not specify a reference denomination, the denomination of the bill first discriminated to be acceptable by the CPU 45 is determined as the reference denomination and written in the RAM 47.

Furthermore, the CPU 45 determines the denomination of the bill first discriminated to be acceptable as a reference denomination and writes it in the RAM 47 in the embodiment shown in FIGS. 1 to 6 and the operator specifies a reference denomination and causes the CPU 45 to write it in the RAM 47 in the embodiment shown in FIG. 10. However, in both the embodiments, all acceptable bills may be fed into the bill stacking section 18 irrespective of the denominations of bills discriminated to be acceptable and a bill count of bills for each denomination may be stored in the count memory area of the RAM 47.

Moreover, in the above described embodiments, the transmitted light amount detection data of the bill, the size detection data of the bill, the magnetic detection data of the bill, the surface pattern detection data of the bill, the fluorescence detection data of the bill and the metal piece detection data of the bill input from the sensor device 6 are compared with the reference transmitted light amount data for each denomination, the reference size data of bills for each denomination, the reference magnetic data for each denomination, the reference surface pattern data for each denomination, the reference fluorescence data of bills for each denomination and the reference metal piece data of bills for each denomination read out from the ROM 46. However, in accordance with bills to be counted, bills may be discriminated based on data which are selected from among these data and suitable for discriminating the denominations of bills. For example, in the case where size differs depending upon denomination, as in the case of Japanese bills, time for discrimination may be shortened by comparing the size detection data of a bill input from the sensor device 6 with the reference size data of bills for each denomination read out from the ROM 46, thereby tentatively determining the denomination of the bill, and comparing the magnetic detection data of the bill, the surface pattern detection data of the bill, the fluorescence detection data of the bill and the metal piece detection data of the bill input from the sensor device 6 with the reference magnetic data, the reference surface pattern data of the bill, the reference fluorescence data of the bill and the reference metal piece data of the bill of the tentatively determined denomination stored in the ROM 46, thereby discriminating whether or not the bill is acceptable and the denomination of the bill.

Further, in the above described embodiments, the bill counting machine is constituted so that whether or not a bill is acceptable and the denomination of the bill are discriminated based on the detection data of the bill detected by the sensor device 6 and the reference data of bills for each denomination read out from the ROM 46, whether or not the thus discriminated denomination of the bill coincides with the reference denomination written in the RAM 47 is discriminated, the CPU increases the count number of the denomination by one when they do not coincide with each other, and the bill of the denomination different from the reference denomination and a bill following it are prevented by the stopper 17 from being fed into the bill stacking section 18. However, when it is discriminated that the denomination of the bill differs from the reference denomination, it is possible to operate the stopper 17 for preventing the bill of the denomination different from the reference denomination and a bill following it from being fed into the bill stacking section 18 without counting the bill.

Furthermore, in the embodiment shown in FIGS. 1 to 6, when bill jamming has occurred, when two or more bills are being simultaneously conveyed and multiple feed has occurred, when an unacceptable bill has been detected or when a bill of a denomination different from the reference denomination has been detected, the CPU 45 displays such information on the display section 39, thereby informing the operator of the fact that bill jamming has occurred, that two or more bills are being simultaneously conveyed and multiple feed has occurred, that an unacceptable bill has been detected or that a bill of a denomination different from the reference denomination has been detected, and in the embodiment shown in FIG. 10, when bill jamming has occurred, when two or more bills are being simultaneously conveyed and multiple feed has occurred, when an unacceptable bill has been detected or when a bill of a denomination different from the reference denomination has been detected, the CPU 45 not only displays such information on the display section 39 but also outputs an alarm signal to the alarm means 51, thereby causing it to generate alarm sound to inform the operator of the fact that bill jamming has occurred, that two or more bills are being simultaneously conveyed and multiple feed has occurred, that an unacceptable bill has been detected or that a bill of a denomination different from the reference denomination has been detected. However, the bill counting machine may be constituted so that when bill jamming has occurred, when two or more bills are being simultaneously conveyed and multiple feed has occurred, when an unacceptable bill has been detected or when a bill of a denomination different from the reference denomination has been detected, the CPU 45 does not display on the display section 39 the information that bill jamming has occurred, that two or more bills are being simultaneously conveyed and multiple feed has occurred, that unacceptable bill has been detected or that a bill of a denomination different from the reference denomination has been detected, but only outputs an alarm signal to the alarm means 51, thereby generating only an alarm sound to inform the operator of the fact that bill jamming has occurred, that two or more bills are being simultaneously conveyed and multiple feed has occurred, that an unacceptable bill has been detected or that a bill of a denomination different from the reference denomination has been detected. Further, when bill jamming has occurred, when two or more bills are being simultaneously conveyed and multiple feed has occurred, when an unacceptable bill has been detected or when a bill of a denomination different from the reference denomination has been detected, it is not absolutely necessary to cause the display section 39 to display the information that that bill jamming has occurred, that two or more bills are being simultaneously conveyed and multiple feed has occurred, that an unacceptable bill has been detected or that a bill of a denomination different from the reference denomination has been detected and it is also not absolutely necessary to cause the alarm means 51 to generate an alarm sound to inform the operator of the fact that bill jamming has occurred, that two or more bills are being simultaneously conveyed and multiple feed has occurred, that an unacceptable bill has been detected or that a bill of a denomination different from the reference denomination has been detected.

Moreover, in the above described embodiments, when the CPU 45 does not detect bill jamming in the bill counting machine and as a result of the detection of bills by the sensor device 6, the CPU 45 judges that the total detected number of bills has become equal to a number of bills N (e.g., 200) equal to the stacked bill capacity of the bill stacking section 18, then, if the bill sensor 2 detects a bill present in the bill hopper 1, the CPU 45 automatically restarts the counting of bills at the time a stacked bill detection signal ceases to be input from the stacked bill sensor 19 owing to the collection of the bills stacked in the bill stacking section 18 by the operator. However, the bill counting machine may be constituted so as to restart the counting operation by pressing the "START" key 37.

Further, in the above described embodiments, the counting of bills is performed until the bill sensor 2 no longer detects a bill charged in the bill hopper 1 and the operator then presses the "END" key 38 of the operation panel 20 to complete the counting of bills, thereby outputting a counting completion signal to the CPU 45. However, the "END" key 38 need not be provided and, instead, the CPU can complete the counting of bills when a predetermined time period has passed after the bill sensor 2 and the sensor device 6 last detected a bill.

Furthermore, in the above described embodiments, although a bill is discriminated by detecting metal pieces contained in the bill by the sensor device 6, a bill can be discriminated by detecting plastic pieces contained in the bill instead of metal pieces or together with metal pieces.

Moreover, in the above described embodiments, although the stopper 17 is formed of a flexible material such as a piano wire, the stopper 17 may be formed of an arbitrary material, although it is preferable to form the stopper 17 of a material having a light weight such as a linear material and it is neither absolutely necessary to form the stopper 17 of a piano wire nor absolutely necessary to form the stopper 17 of a flexible material.

Further, although the stopper 17 is formed frame-like so as to form a substantially rectangular opening 21 in the embodiment shown in FIGS. 1 to 6 and the stopper 17 is formed frame-like so as to have two substantially rectangular openings 21*a* and 21*b* in the embodiment shown in FIGS. 7 to 9, it is not absolutely necessary to form the stopper 17 so as to form one or two substantially rectangular openings 21, 21*a*, 21*b*.

Furthermore, in the above described embodiments, although the stopper 17 is formed frame-like, it is not absolutely necessary to form the stopper 17 frame-like. Insofar as the stopper 17 has a shape that makes the air resistance thereof when it is swung and that does not interfere with the pair of vane wheels 15, 15, the shape of the stopper 17 may be arbitrarily selected, and if the stopper 17 is disposed at a position so that it does not interfere with the pair of vane wheels 15, 15, the stopper 17 need not be shaped so as not to interfere with the pair of vane wheels 15, 15.

Moreover, in the above described embodiments, although the stopper 17 is constituted so as to be swingable between the retracted position and the projecting position, if the stopper 17 is constituted so as not to prevent bills from being conveyed in the bill conveying passage 7 when it is located at the retracted position and to prevent bills from being fed into the bill stacking section 18 when it is located at the projecting position, it is not absolutely necessary to constitute the stopper 17 to be swingable and the stopper 17 may be constituted, for example, to be vertically movable between the retracted position and the projecting position.

Further, in the above described embodiments, although the stopper 17 is swingable between the retracted position and the projecting position outside of the bill counting machine, if the outer wall of the bill counting machine is formed with an opening and bills stopped by the stopper 17 and to be collected can be collected through the opening formed in the outer wall of the bill counting machine, it is not absolutely necessary to dispose the stopper 17 outside of the bill counting machine and the stopper 17 may be disposed inside of the bill counting machine.

Furthermore, in the above described embodiments, although the stopper 17 is not biased, it is possible to provide a spring or the like to constantly bias the stopper 17 to the retracted position and swing the stopper 17 by the solenoid 16 against the biasing force of the spring or the like to the projecting position.

Moreover, in the above described embodiments, although the stopper 17 is constituted so as to be driven by the solenoid 16, means for driving the stopper 17 is not limited to the solenoid 16 but other means such as a motor may be used for driving the stopper 17.

Further, in the above described embodiments, although the pair of vane wheels 15, 15 is disposed so that a part thereof is located outside of the bill counting machine, the pair of vane wheels 15, 15 may be disposed inside of the bill counting machine.

Furthermore, in the above described embodiments, although the pair of vane wheels 15, 15 receive a bill between adjacent vanes and feed it to the bill stacking section 18, it is not absolutely necessary to provide a pair of vane wheels 15, 15 and it is possible to feed bills to the bill stacking section 18 using one vane wheel or three or more vane wheels.

According to the present invention, it is possible to provide a bill counting machine of small size which can prevent bills from jamming when the counting operation is restarted, and can sort unacceptable bills from acceptable bills and reliably collect them.

What is claimed is:

1. A bill counting machine comprising a bill setting section where bills to be counted are set, a bill take-out means for taking out bills set in the bill setting section one by one into a main body of the bill counting machine, bill conveying means for conveying the bills taken out into the main body of the bill counting machine in a bill conveying passage, a sensor device for detecting optical properties and/or magnetic properties of each bill and producing detection data of the bill, reference data storing means for storing reference data of bills, discriminating and counting means for comparing the detection data of the bill produced by the sensor device with the reference data of bills, thereby discriminating whether or not the bill is acceptable, the denomination of the bill and whether bills are being conveyed by the bill conveying means one by one and counting bills to be counted, and a bill stacking section, the bill counting machine further comprising a stopper locatable at a projecting position in the bill conveying passage downstream of the sensor device, the discriminating and counting means being constituted so as not to count a bill discriminated as unacceptable and a following bill or not to count two or more bills discriminated to be simultaneously conveyed and a following bill when it discriminates that the bill is unacceptable or that two or more bills are being simultaneously conveyed and to locate the stopper in the projecting position, the stopper located at the projecting position being accessible from outside of the main body of the bill counting machine.

2. A bill counting machine in accordance with claim 1, wherein the stopper is constituted so as to be movable between a retracted position where it does not interfere with bills conveyed in the bill conveying passage by the bill conveying means and the projecting position where it projects into the bill conveying passage.

3. A bill counting machine in accordance with claim 2, wherein the stopper is constituted so as to be swingable between the retracted position and the projecting position.

4. A bill counting machine in accordance with claim 2, wherein the stopper is constituted so as to be driven by a solenoid and the discriminating and counting means is adapted for actuating the solenoid, thereby moving the stopper between the retracted position and the projecting position.

5. A bill counting machine in accordance with claim 3, wherein the stopper is constituted so as to be driven by a solenoid and the discriminating and counting means is adapted for actuating the solenoid, thereby moving the stopper between the retracted position and the projecting position.

6. A bill counting machine in accordance with claim 1, wherein the stopper is formed to be frame-like by a linear member so as to form at least one opening.

7. A bill counting machine in accordance with claim 2, wherein the stopper is formed to be frame-like by a linear member so as to form at least one opening.

8. A bill counting machine in accordance with claim 3, wherein the stopper is formed to be frame-like by a linear member so as to form at least one opening.

9. A bill counting machine in accordance with claim 4, wherein the stopper is formed to be frame-like by a linear member so as to form at least one opening.

10. A bill counting machine in accordance with claim 5, wherein the stopper is formed to be frame-like by a linear member so as to form at least one opening.

11. A bill counting machine in accordance with claim 6 which further comprises at least one vane wheel for stacking counted bills in the bill stacking section and the at least one vane wheel is disposed in the at least one opening of the stopper.

12. A bill counting machine in accordance with claim 7 which further comprises at least one vane wheel for stacking counted bills in the bill stacking section and the at least one vane wheel is disposed in the at least one opening of the stopper.

13. A bill counting machine in accordance with claim 8 which further comprises at least one vane wheel for stacking counted bills in the bill stacking section and the at least one vane wheel is disposed in the at least one opening of the stopper.

14. A bill counting machine in accordance with claim 9 which further comprises at least one vane wheel for stacking counted bills in the bill stacking section and the at least one vane wheel is disposed in the at least one opening of the stopper.

15. A bill counting machine in accordance with claim 10 which further comprises at least one vane wheel for stacking counted bills in the bill stacking section and the at least one vane wheel is disposed in the at least one opening of the stopper.

16. A bill counting machine in accordance with claim 11, herein an outer wall portion of the main body of the bill counting machine is formed with at least one opening and the at least one vane wheel is disposed in the at least one opening formed in the outer wall portion while the stopper is disposed outside of the main body of the bill counting machine.

17. A bill counting machine in accordance with claim 1 which further comprises a sensor for detecting bills conveyed in the bill conveying passage and the discriminating and counting means is constituted so as to stop the bill take-out means at a time when the discriminating and counting means discriminates that a bill is unacceptable or at a time when the discriminating and counting means discriminates that two or more bills are being simultaneously conveyed by the bill conveying means, to locate the stopper at the projecting position in the bill conveying passage at a time when the sensor detects the bill discriminated as unacceptable by the discriminating and counting means or the two or more bills being simultaneously conveyed by the bill conveying means, and to stop the bill conveying means when a predetermined time period has passed after the stopper was located at the projecting position in the bill conveying passage.

18. A bill counting machine in accordance with claim 1 which further comprises memory means for storing a count determined by the discriminating and counting means, and the discriminating and counting means is adapted to store a count for each denomination of bills in a bill count memory area of the memory means when it discriminates that the bill is acceptable.

19. A bill counting machine in accordance with claim 1 which further comprises memory means for storing a count determined by the discriminating and counting means and when the discriminating and counting means discriminates that a bill is acceptable but the denomination thereof is different from a reference denomination, it locates the stopper at the projecting position in the bill conveying passage without counting the bill of the denomination different from the reference denomination and a following bill.

20. A bill counting machine in accordance with claim 19, wherein the discriminating and counting means is constituted so as to define a denomination of a bill first discriminated as acceptable as the reference denomination.

21. A bill counting machine in accordance with claim 19 which further comprises reference denomination setting means for specifying the reference denomination.

22. A bill counting machine in accordance with claim 1 which further comprises reporting means for reporting results of discrimination made by the discriminating and counting means, and the discriminating and counting means is constituted so that, when it discriminates that a bill is unacceptable or that two or more bills are being simultaneously conveyed by the bill conveying means, it causes the reporting means to report that the bill was discriminated as unacceptable or that it was discriminated that two or more bills were being simultaneously conveyed by the bill conveying means, the reporting means being constituted as a means selected from a group consisting of a display means for displaying results of bill discrimination and an alarm means for generating an alarm.

23. A bill counting machine in accordance with claims 19 which further comprises reporting means for reporting results of discrimination made by the discriminating and counting means, and the discriminating and counting means is constituted so that, when it detects a bill of a denomination different from the reference denomination, it causes the reporting means to report that the bill of a denomination different from the reference denomination has been detected, the reporting means being constituted as a means selected from a group consisting of a display means for displaying results of bill counting and an alarm means for generating an alarm.

24. A bill counting machine in accordance with claim 18, wherein the bill setting section is constituted so as to hold a greater number of bills than that the number of bills stackable in the bill stacking section and the discriminating and counting means is constituted so as to define an operation for counting bills until a maximum number of bills stackable in the bill stacking section have been stacked therein as one counting cycle, increase a bill count and stores the thus increased bill count every time it detects a bill to be counted, thereby counting bills to be counted until one counting cycle is completed, stop the bill take-out means and the bill conveying means and store a bill count determined during the counting cycle in a tentative count memory area in the memory means as a tentative bill count every time one counting cycle of bills is completed, and then drive the bill take-out means and the bill conveying means, thereby starting a succeeding counting cycle of bills set in the bill setting section.

25. A bill counting machine in accordance with claim 24, wherein the discriminating and counting means is constituted so as to overwrite the tentative count determined and stored in the tentative count memory area of the memory means at the proximate counting cycle with a bill count determined in the counting cycle every time one counting cycle is completed, thereby updating the tentative count, and to store the thus updated tentative count in the tentative count memory area of the memory means.

26. A bill counting machine in accordance with claim 24, wherein the discriminating and counting means is constituted so that when it discriminates that bill jamming has occurred in the bill counting machine it stops the bill take-out means and the bill conveying means, clears the bill count stored in the bill count memory area of the memory means, stores the tentative count stored in the tentative count memory area as an initial value of the bill count in the bill count memory area, and drives the bill take-out means and the bill conveying means, thereby restarting the counting of bills set in the bill setting section.

27. A bill counting machine in accordance with claim 24, wherein the discriminating and counting means is constituted so as to store the number of counted bills for each denomination in the bill count memory area of the memory means and store the number of bills for each denomination counted in the counting cycles already performed as a tentative bill count in the tentative count memory area of the memory means.

* * * * *